US009452663B2

(12) United States Patent
Watanabe et al.

(10) Patent No.: US 9,452,663 B2
(45) Date of Patent: Sep. 27, 2016

(54) SHADING DEVICE

(71) Applicants: HAYASHI TELEMPU Co., Ltd., Nagoya-shi, Aichi (JP); NIFCO INC., Yokosuka-shi, Kanagawa (JP)

(72) Inventors: Keisuke Watanabe, Aichi (JP); Toshiya Nishiura, Aichi (JP); Yoshihiro Tsuchimoto, Aichi (JP); Naofumi Yagame, Kanagawa (JP)

(73) Assignees: HAYASHI TELEMPU Co., Ltd., Nagoya-shi, Aichi (JP); NIFCO INC., Yokosuka-shi, Kanagawa (JP)

( * ) Notice: Subject to any disclaimer, the term of this patent is extended or adjusted under 35 U.S.C. 154(b) by 0 days.

(21) Appl. No.: 14/790,005

(22) Filed: Jul. 2, 2015

(65) Prior Publication Data
US 2015/0300087 A1 Oct. 22, 2015

Related U.S. Application Data

(63) Continuation of application No. PCT/JP2013/081237, filed on Nov. 20, 2013.

(30) Foreign Application Priority Data

Jan. 28, 2013 (JP) .................................. 2013-013562

(51) Int. Cl.
*B60J 1/20* (2006.01)
*E06B 9/40* (2006.01)
(Continued)

(52) U.S. Cl.
CPC ............. *B60J 1/2033* (2013.01); *B60J 1/2038* (2013.01); *B60J 1/2063* (2013.01); *B60J 1/2086* (2013.01); *E06B 9/40* (2013.01); *E06B 9/62* (2013.01); *E06B 9/80* (2013.01); *E06B 2009/802* (2013.01)

(58) Field of Classification Search
CPC ............ E06B 9/80; E06B 9/62; E06B 9/802; E06B 9/40; E06B 2009/802; B60J 1/2063; B60J 1/2038; B60J 1/2033
USPC ....................................................... 254/375
See application file for complete search history.

(56) References Cited

U.S. PATENT DOCUMENTS 4,228,843 A * 10/1980 Kobayashi ................ E06B 9/60
160/306
5,205,332 A * 4/1993 Lii .......................... B60J 1/2077
160/23.1
(Continued)

FOREIGN PATENT DOCUMENTS

EP 0751278 A1 * 1/1997
JP H07-025435 Y 6/1995
(Continued)

OTHER PUBLICATIONS

International Search Report for PCT/JP2013/081237 dated Feb. 4, 2014.
(Continued)

*Primary Examiner* — Blair M Johnson
(74) *Attorney, Agent, or Firm* — Yokoi & Co., U.S.A.; Toshiyuki Yokoi

(57) ABSTRACT

The present invention discloses a shading device includes a screen, a shaft portion having a lock portion to be locked, a biasing mechanism, a locking member that is engaged at a lock position with the lock portion, and a housing in which the end portion of the shaft portion is inserted. The housing has a sliding guide portion in which the locking member is slid. The sliding guide portion is capable of guiding the locking member in a direction passing through the lock position and a lock release position, and has a lock position engagement portion for stopping the locking member from sliding at the lock position. The locking member includes a slide engagement portion that engages with the lock position engagement portion at the lock position and an operating portion that can be flexed to release the slide engagement portion from the lock position engagement portion.

6 Claims, 15 Drawing Sheets

(51) Int. Cl.
*E06B 9/62* (2006.01)
*E06B 9/80* (2006.01)

(56) References Cited

U.S. PATENT DOCUMENTS

| | | | | |
|---|---|---|---|---|
| 5,226,467 | A * | 7/1993 | Lii | B60J 1/2033 |
| | | | | 160/302 |
| 7,694,712 | B2 * | 4/2010 | Schimko | B60J 1/2027 |
| | | | | 160/314 |
| 7,931,069 | B2 * | 4/2011 | Cannaverde | E06B 9/38 |
| | | | | 160/170 |
| 2012/0048484 | A1 * | 3/2012 | Munsters | B60J 1/2063 |
| | | | | 160/313 |
| 2016/0137037 | A1 * | 5/2016 | Watanabe | B60J 1/2038 |
| | | | | 160/370.22 |

FOREIGN PATENT DOCUMENTS

| | | |
|---|---|---|
| JP | H07-065446 B | 7/1995 |
| JP | 2000-282767 A | 10/2000 |
| JP | 4713940 B | 6/2011 |

OTHER PUBLICATIONS

PCT written openion dated Feb. 4, 2014.

* cited by examiner

SHADING DEVICE

CROSS-REFERENCES TO RELATED APPLICATIONS

This Application claims the benefit of priority and is a Continuation application of the prior International Patent Application No. PCT/JP2013/081237, with an international filing date of Nov. 20, 2013, which designated the United States, and is related to the Japanese Patent Application No. 2013-013562, filed Jan. 28, 2013, the entire disclosures of all applications are expressly incorporated by reference in their entirety herein.

BACKGROUND OF THE INVENTION

1. Field of the Invention

The present invention relates to a shading device installed on a vehicle door or the like.

2. Description of Related Art

On the vehicle door or the like, a sunshade device is provided for blocking sunlight for the purpose of preventing dazzling and for protecting privacy. In the sunshade device for the vehicle door, in many cases, a shading screen is wound and housed inside a door body when not in use. When in use, the screen is drawn out upward along a window glass and the screen is held at a use position to cover the window glass by, for example, engaging a hook of a tip of the screen with an engagement portion of the door side.

A barrel member having a cylindrical shape is provided on the sunshade device to wind the shading screen in a housing position. The barrel member is biased in a winding direction by a spring member. The shading screen is fastened to the barrel member at one end and used by being drawn out to the use position against a biasing force of the spring member. If the engagement of the hook is released when the screen is located at the use position, the screen is automatically wound around the barrel member. If the spring member is housed in an inner space of the barrel member, a coil spring, which is formed by spirally winding a thin metal wire, is used as the spring member. In addition, a spiral spring, which is formed by winding a thin metal plate, is also used.

The shading screen is preliminarily biased so that a winding force is generated in the winding direction even at a nonuse position, which is a position wound around the barrel member. This is for the purpose of preventing a backlash of the sunshade device, for example. In order to bias the shading screen even when it is wound, the barrel member should be preliminarily wound around a bearing portion in the winding direction by a predetermined amount before the sunshade device is attached to the vehicle door. If the preliminary winding is performed when the sunshade device is attached, efficiency is not good. Therefore, it is proposed that a rotation of the barrel member is prohibited only during when the sunshade device is attached to the vehicle door and the rotation is allowed after the attachment.

In a window shade device for automobile disclosed in Japanese Patent No. 4713940, a biased winding shaft (reference numeral 20) is held by inserting a thin holding pin (reference numeral 75) into a hole (reference numeral 51) of a cover (reference numeral 47), a hole (reference numeral 62) of a connecting shaft (reference numeral 40), and a blind hole (reference numeral 52) of the cover. However, it is difficult to visually confirm small holes to which the thin holding pin is inserted. Therefore, operation becomes difficult and man-hours are increased. In addition, after the sunshade device is attached to the vehicle door, the locked state is released by removing the holding pin. Therefore, the unnecessary holding pin should be disposed.

Furthermore, once the winding shaft is unrotatably fixed, inspection work, such as an operation check of opening/closing of the screen, cannot be performed before the sunshade device is assembled on the vehicle. In addition, when the sunshade device is required to be removed from the vehicle door at the time of providing a service such as the time of repairing the sunshade device, for example, the sunshade device cannot be removed in a state of maintaining the initial torque, i.e., a state of maintaining the state of being preliminarily wound. Therefore, maintainability is not good.

A sunshade device disclosed in Japanese Unexamined Patent Application Publication No. 2000-282767 includes a locking member (reference numeral 110) that is capable of engaging with a square columnar engagement portion (reference numeral 54) of an end cap (reference numeral 34) of a cylindrical body (reference numeral 24). On the locking member, a rectangular hole portion (reference numeral 114) that engages with the square columnar engagement portion, a circular hole portion (reference numeral 116) that is continued with the rectangular hole portion, and an abutting surface (reference numeral 118) that is located at the other end side of the rectangular hole portion are formed. Before the sunshade device is inserted into a fitting recessed portion (reference numeral 120) of the body, the abutting surface is projected below a bottom portion of a protective member (reference numeral 18B). Therefore, the rectangular hole portion engages with the square columnar engagement portion and the tubular body is unrotatably fixed. When the sunshade device is inserted into the fitting recessed portion, the abutting surface is pushed into the protective member and the square columnar engagement portion becomes rotatable by being guided by the circular hole portion. Since the abutting surface is pushed into the protective member, the locking member located at a lock release position cannot be pulled out to a lock position.

Therefore, once the tubular body is unrotatably fixed, inspection work of the sunshade device cannot be performed before the sunshade device is assembled on the vehicle also in the above structure. When providing a service, the sunshade device cannot be removed from the vehicle door in a state of maintaining the state that the tubular body is preliminarily wound.

Note that the above described problems also occur in the shading devices other than the sunshade device, for example, a tonneau cover device.

BRIEF SUMMARY OF THE INVENTION

The present invention discloses a shading device which is convenient when performing the inspection.

One aspect of the shading device of the present invention comprises:

a screen;

a shaft portion to which one end of the screen is fastened, the shaft portion having a lock portion to be locked, the lock portion being formed at an end portion of the shaft portion;

a biasing mechanism that biases the shaft portion in a winding direction of the screen;

a locking member that engages with the lock portion at a lock position where the locking member prohibits a rotation of the shaft portion; and a housing into which the end portion of the shaft portion is inserted, the housing having a sliding guide portion in which the locking member is slid, wherein the sliding guide portion is capable of guiding the locking member in a direction passing through the lock position and a lock release position where the lock portion is released from the locking member, and the sliding guide portion further includes a lock position engagement portion for stopping the locking member from sliding at the lock position, and the locking member includes a slide engagement portion that engages with the lock position engagement portion at the lock position and an operating portion that can be flexed to release the slide engagement portion from the lock position engagement portion.

Before the shading device is assembled with the body, if the shaft portion is preliminarily wound in the winding direction in a state that the locking member is located at the lock release position and then the locking member is slid to the lock position, the shaft portion can be maintained in a state of being preliminarily wound. After the shading device is assembled, if the operating portion is operated so that the operating portion is flexed, the slide engagement portion is released from the lock position engagement portion. Therefore, the locking member can be easily slid to the lock release position to release the locked state of the shaft portion. Furthermore, even after the locked state of the shaft portion is released once, the rotation of the shaft portion can be prohibited again by sliding the locking member to the lock position. Therefore, if the locking member is slid to the lock position in a state that the shaft portion is preliminarily wound in the winding direction by sliding the locking member to the lock release position again, the shaft portion can be maintained in a state of being preliminarily wound. Thus, an operation inspection of the shading device can be performed many times. In addition, workability during the service operation is improved, for example, when a failure occurs.

Here, the screen can be any screen as long as it blocks at least a part of transmitted light. The screen is not limited to the purpose of sun shading.

The shaft portion includes a cylindrical member, a rod-like member and the like. The shaft portion can be a single member or a combination of a plurality of members.

The biasing mechanism includes a spring, a rubber and the like.

The operating portion can be formed at one place and two or more places. A combination of the lock position engagement portion and the slide engagement portion can be one group or two or more groups.

The present invention can provide a shading device on which operation inspection can be performed many times.

DETAILED DESCRIPTION OF THE INVENTION

Figure 1:
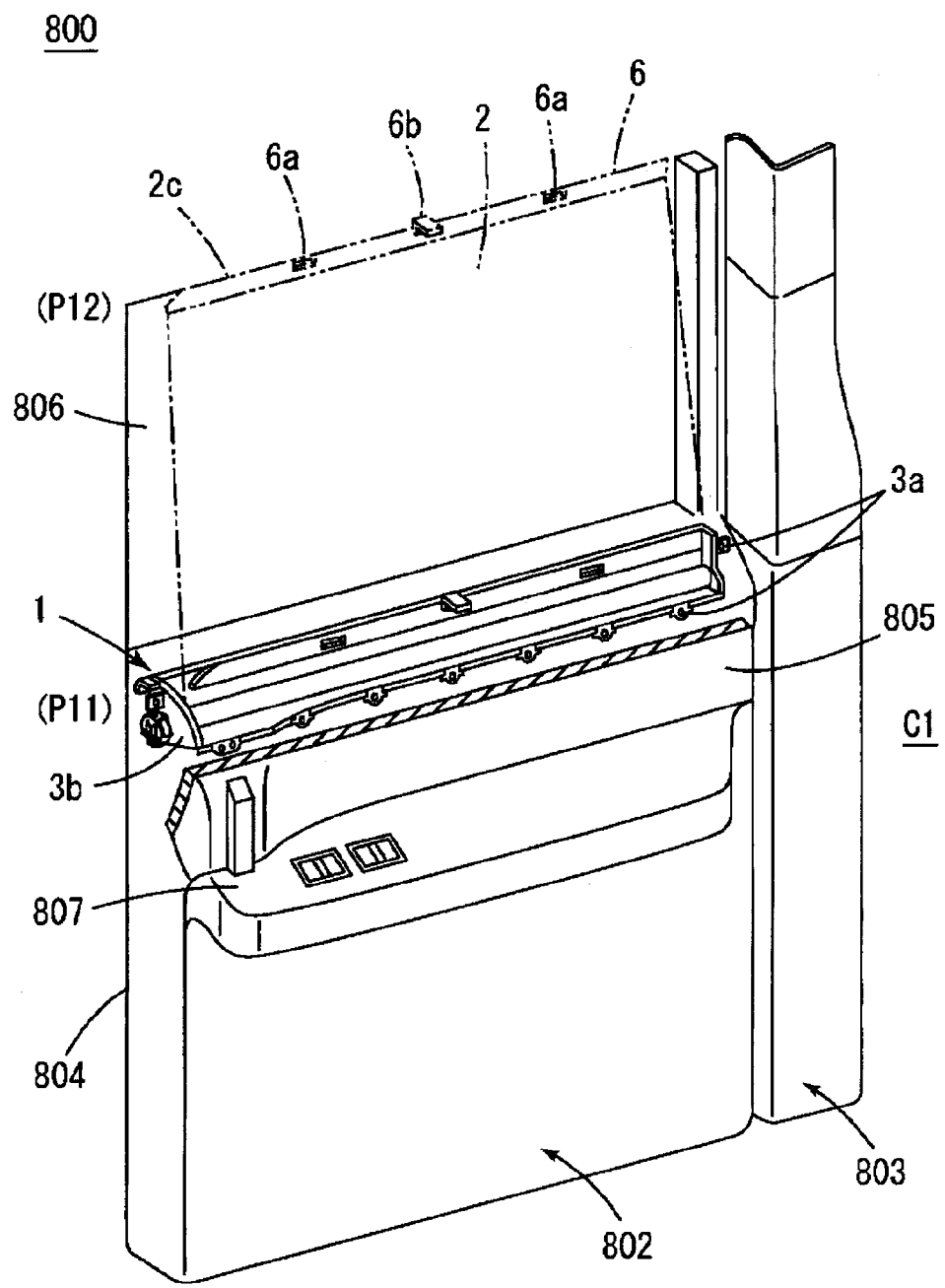
FIG. 1 is a perspective view of an example of a side door to which a shading device 1 is assembled, seen from a side of a vehicle cabin C1.

An embodiment of the present invention will be described below. Of course, the below-described embodiment merely exemplifies the present invention. All features disclosed in the embodiment are not necessarily required to solve the problem of the present invention.

(1) Outline of Technology

At first, an outline of the present technology will be explained with reference to FIGS. 1 to 15.

A shading device 1 includes, as basic components, a screen 2, a shaft portion 1a to which one end 2b of the screen 2 is fastened, the shaft portion 1a having a lock portion 8e to be locked, the lock portion being formed at an end portion 8f of the shaft portion 1a, a biasing mechanism 1b that biases the shaft portion 1a in a winding direction DR1 of the screen 2, a locking member 1c that engages with the lock portion 8e at a lock position P1 where the locking member 1c prohibits a rotation of the shaft portion 1a, and a housing 1d into which an end portion 8f of the shaft portion 1a is inserted, the housing 1d having a sliding guide portion 10d (including 110d, 210d) in which the locking member 1c is slid. The sliding guide portion 10d is capable of guiding the locking member 1c in a direction (guide direction D1) passing through a lock position P1 and a lock release position P2 where the lock portion 8e is released from the locking member 1c, and the sliding guide portion 10d further includes a lock position engagement portion 1f for stopping the locking member 1c from sliding at the lock position P1. The locking member 1c includes a slide engagement portion 1e that engages with the lock position engagement portion 1f at the lock position P1 and an operating portion 9b (including 1i) that can be flexed to release the slide engagement portion 1e from the lock position engagement portion 1f. Operation inspection can be performed many times on the shading device 1.

The sliding guide portion 10d can include a release position engagement portion 1g that engages with the slide engagement portion 1e of the locking member 1c at the lock release position P2. The operating portion 9b can be specified to be flexed to release the slide engagement portion 1e from the release position engagement portion 1g. The present aspect can provide a suitable shading device 1 on which operation inspection can be performed many times.

Of course, a combination of the release position engagement portion 1g and the slide engagement portion 1e can be one group and two or more groups.

The locking member 1c can include a pair of the operating portions 9b that can be flexed in a clamping direction D2 with respect to a track T1 of sliding and a pair of the slide engagement portions 1e that are simultaneously moved with each of the operating portions 9b. The pair of the slide engagement portions 1e can be formed facing outward with respect to the track T1 and opposite to each other. The sliding guide portion 10d can include a pair of the lock position engagement portions 1f that engage with each of the pair of the slide engagement portions 1e. In this case, a worker can release the slide engagement portion 1e from the lock position engagement portion 1f only by pinching the pair of the operating portions 9b by fingers. Therefore, the present aspect can further increase the workability, for example, when inspecting the shading device 1.

The housing 1d can include a groove 1h that is directed in the direction (guide direction D1) passing through the lock position P1 and the lock release position P2. The locking member 1c can include a sliding piece 9d that is slidably inserted into the groove 1h. The present aspect can prevent a backlash of the locking member 1c. Therefore, operability of sliding the locking member 1c can be further increased and generation of abnormal noise can be suppressed.

A second lock release position P3 can be provided in the direction (guide direction D1) passing through the lock position P1 and the lock release position P2. The sliding guide portion 10d can prohibit the locking member 1c from sliding to the lock position P1 when the locking member 1c is slid to the second lock release position P3.

Before the shading device 1 is assembled with the body, inspection work of the shading device 1 can be easily performed by switching the position of the locking member 1c between the lock position P1 and the first lock release position P2. After assembled to the body, the locking member 1c is prohibited to return to the lock position P1 again by sliding the locking member 1c to the second lock release position P3. Therefore, the locking member 1c is prevented from being mistakenly slid to the lock position P1 when using the shading device 1. Thus, malfunction in the opening/closing operation of the shading device 1 can be prevented, and abnormal noise that occurs when the locking member 1c and the lock portion 8e are interfered can be prevented.

The locking member 1c can be specified to be removed from the housing 1d when the locking member 1c is slid from the lock position P1 to an opposite side of the lock release position P2.

Before the shading device 1 is assembled with the body, inspection work of the shading device 1 can be easily performed by switching the position of the locking member 1c between the lock position P1 and the lock release position P2. After assembled to the body, the locking member 1c can be removed from the housing 1d by sliding the locking member 1c to the opposite side of the lock release position P2. Therefore, the locking member 1c is prevented from being mistakenly slid to the lock position P1 when using the shading device 1. Thus, malfunction in the opening/closing operation of the shading device 1 can be prevented, and abnormal noise that occurs when the locking member 1c and the shaft member are interfered can be prevented.

(2) First Example

FIG. 1 shows the first example to use the shading device 1 for vehicle as a sunshade device of a side door (802) of an automobile 800. In the figure, shading device 1 is shown by breaking away an upper portion of the door trim 805. The automobile 800 shown in FIG. 1 is a road running vehicle designed and equipped for being used on a road. In addition, a vehicle cabin C1 is formed around front sheets and rear sheets so that the automobile 800 can be used as a passenger car. A door 802 and a pillar 803 are arranged at a side face portion of the vehicle cabin C1. The shading device 1 is assembled with the door 802 as a sunshade device. The shading device includes the devices called a shade device and a blind device.

A door panel 804, a door trim 805 and a door window 806 are provided on the door 802, for example. The door panel 804 is a kind of a vehicle body panel made of metal such as a steel sheet. The door trim 805 is an interior material attached to the vehicle cabin side of the door panel 804. For the door trim 805, a molded article formed by molding a resin molding material such as a thermoplastic resin by using injection molding or the like, and a resin material in which a skin material, such as a non-woven fabric, a woven fabric and a knitted fabric, is laminated as an interior base material can be used, for example. On the door trim 805 shown in FIG. 1, an armrest 807 having a shape enabling a passenger to rest his/her arms for maintaining a comfortable posture is provided. The shading device 1 is assembled on a back side of the door trim 805 at a position upper than the armrest 807.

Figure 2:
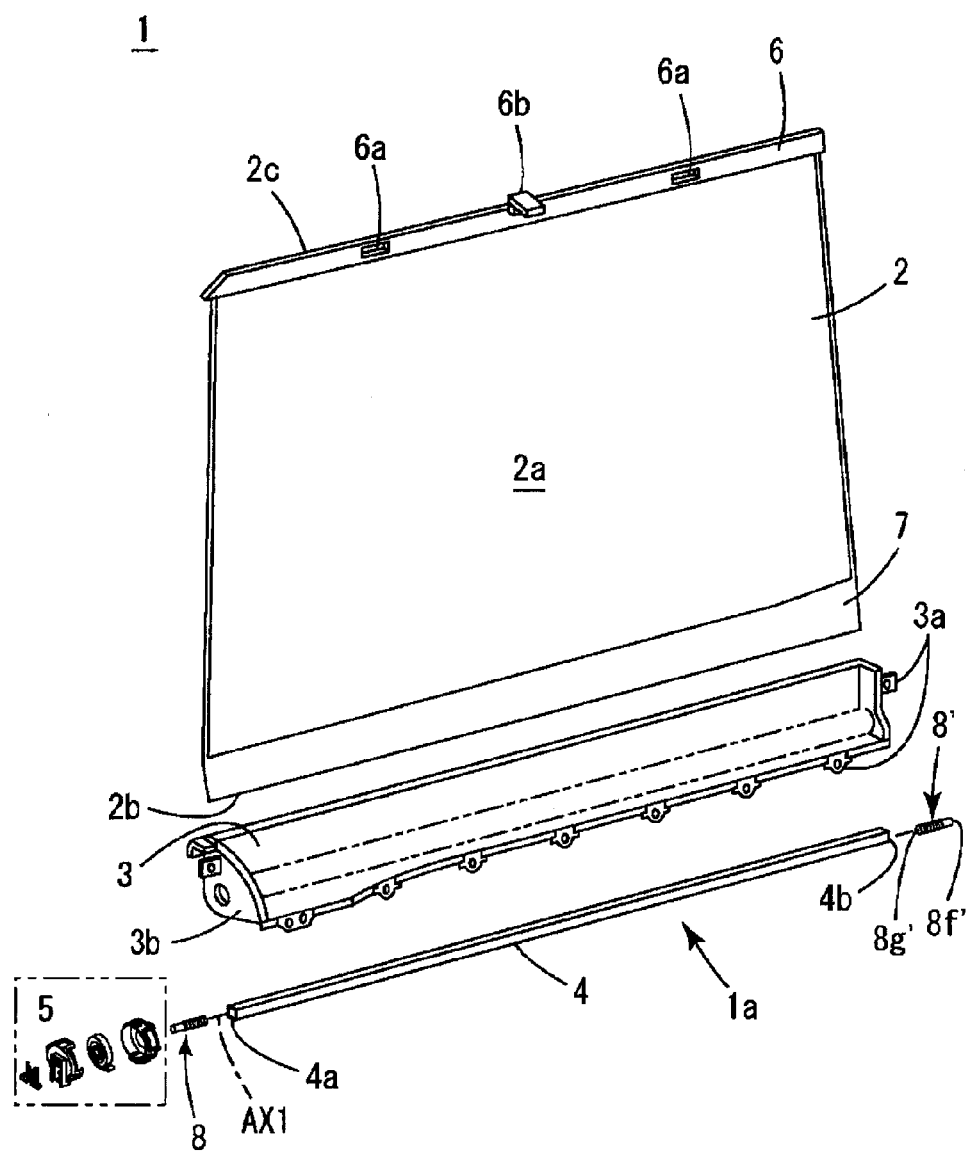
FIG. 2 is an exploded perspective view showing an example of a configuration of the shading device 1.
Figure 3:
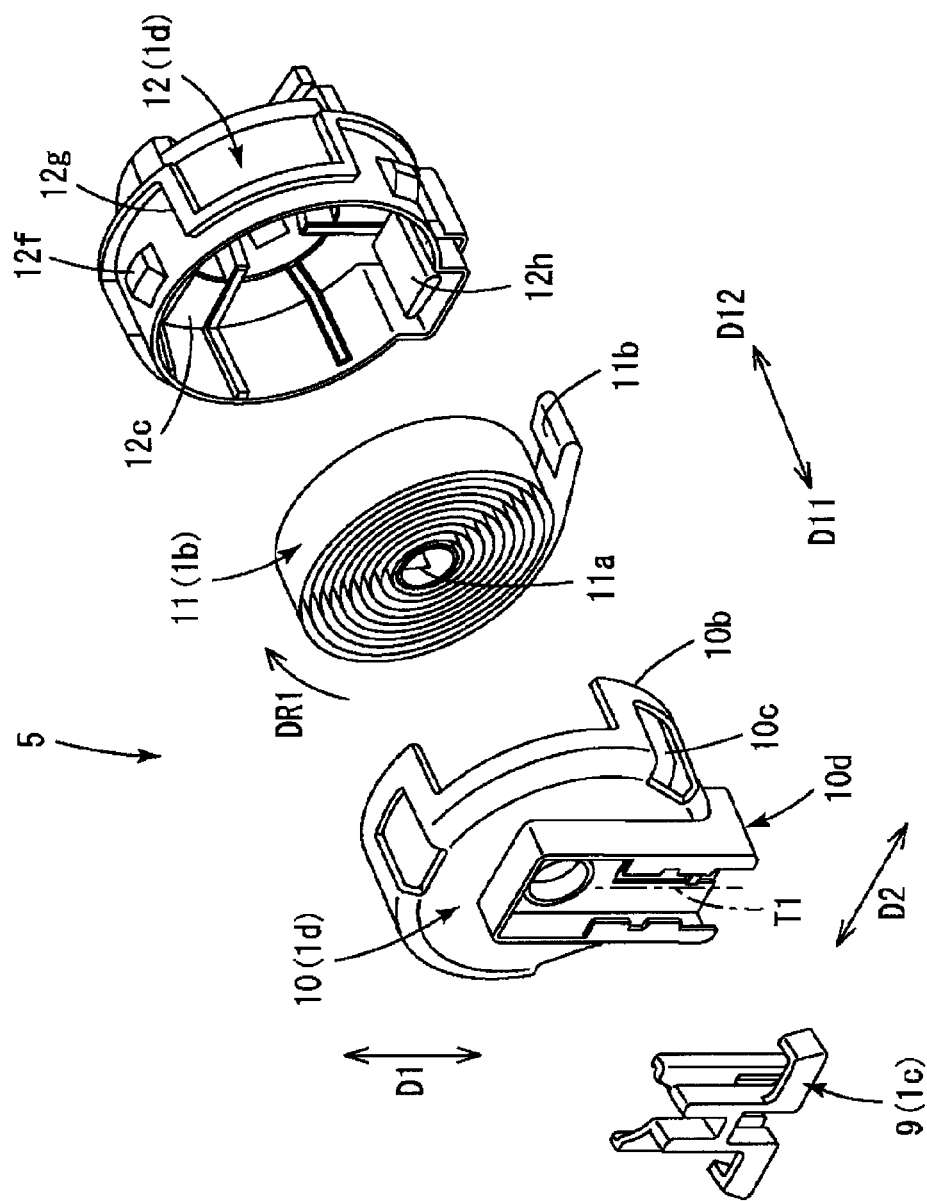
FIG. 3 is an exploded perspective view showing an example of a configuration of an elastic force generating portion 5.
Figure 4:
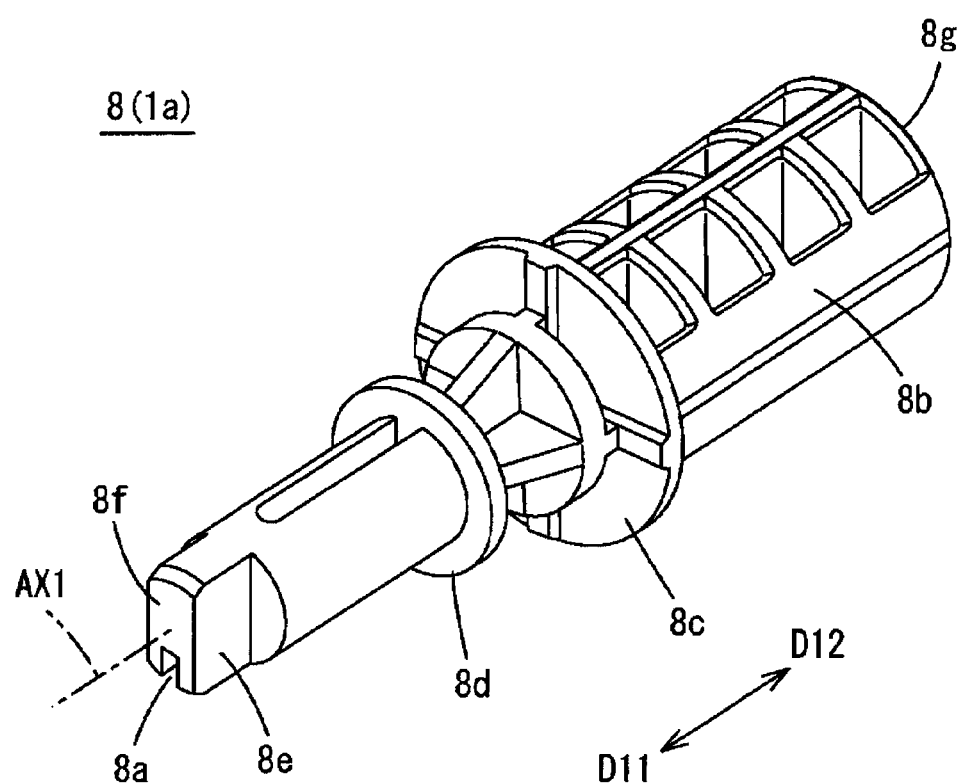
FIG. 4 is a perspective view showing an example of an outer appearance of a shaft member 8 that is assembled to a barrel member (rotary shaft member) 4.

In FIG. 1, the shading device 1 in which the screen 2 is wound around a barrel member 4 is shown by a solid line, and a state that the screen 2 is drawn out upward is shown by a two-dot chain line. FIG. 2 is a perspective view of the shading device 1 in a state of being disassembled to components. FIG. 3 is a perspective view of components of an elastic force generating portion 5 in a disassembled state. FIG. 4 is an enlarged perspective view of a shaft member 8. Note that a reference numeral D11 indicates an outside direction of a rotation axis AX1, and a reference numeral D12 indicates an inside direction of the rotation axis AX1.

The shaft portion 1a of the shading device 1 includes a barrel member 4 and shaft members (rotary shaft members) 8, 8'. The barrel member 4 is housed in a half case 3 so that the barrel member 4 is rotatable around the rotation axis AX1. The barrel member 4 fastens the one end 2b of the screen 2. The barrel member 4 can have a tubular shape such as a cylindrical shape or a bar shape such as a columnar shape. The shaft member 8, which passes through an end face 3b of the half case 3, is assembled with the one end 4a of the barrel member 4. An elastic force generating portion 5 is attached to one end (end portion 80 of the shaft member 8. The elastic force generating portion 5 is an external spring unit using a spiral spring (spring 11). The other end (end portion 8g) side than a first flange portion 8c of the shaft member 8 is inserted into the one end 4a of the barrel member 4 having a tubular shape, for example. A shaft member 8', which is not provided with the elastic force generating portion, is assembled with the other end 4b of the barrel member 4. One end (end portion 8f) of the shaft member 8' is supported by the half case 3 so that the shaft member 8' is rotatable around the rotation axis AX1. The other end (end portion 8g') of the shaft member 8' is inserted into the other end 4b of the barrel member 4 having a tubular shape, for example.

For the material of the barrel member 4, metals such as aluminum and synthetic resins such as thermoplastic resin can be used, for example. If a pipe material formed by extruding aluminum in a tubular shape is used as the barrel member 4, the barrel member 4 can be easily lightweight and strong enough. A size of the tubular barrel member made of aluminum is not particularly limited. For example, an inner diameter can be approximately 4 to 20 mm and an outer diameter can be approximately 6 to 30 mm.

The screen 2 is also called as a blind sheet. The screen 2 blocks at least a part of transmitted light. A body portion 2a of the screen 2 is made of sheet-like material having flexibility to be drawn out from a predetermined winding position P11 to a predetermined drawing position P12. The body portion 2a can be wound from the drawing position P12 to the winding position P11. The body portion 2a of the screen can be fibers such as polyester woven fabric, leather using resin material, a sheet formed by molding resin molding material and the like. A translucent sheet and a transparent sheet capable of blocking ultraviolet rays can be also used. The transmitted light includes ultraviolet rays and the like. The body portion of the screen for the sunshade device is formed, for example, by cutting a soft material having a light-shielding property of approximately 50 to 90% and having flexibility into a predetermined shape. The body portion is drawn out upward from the half case 3 and covers a vehicle door window from inside the vehicle cabin. The shading device 1 blocks sunlight to protect occupants from dazzling, and reduces visibility from outside the vehicle for protecting privacy and protecting against crime during parking.

A double-sided tape 7 is stuck to the one end 2b of the screen 2. The one end 2b of the screen is adhered to an external surface of the barrel member 4 by winding the barrel member 4 on an area to which the double-sided tape 7 is stuck.

A garnish member 6, which is harder than the body portion 2a, is attached to a tip edge (the other end 2c) of the screen 2. For the garnish member 6, a plate-like member, a rod-like member and a cylindrical member can be used, for example. In addition, a molded article such as an injection molded article of synthetic resin can be also used, for example. For the synthetic resin, thermoplastics resins such as polycarbonate (PC), acrylonitrile-butadiene-styrene copolymer (ABS), polypropylene (PP), a composite material of the above materials, and a material formed by adding additives to the above materials can be used, for example. The garnish member can be formed by preparing an inner component and an outer component and then sandwiching the tip edge of the screen by the both components to be engaged and integrated with each other.

Engagement holes 6a, 6a are provided on the garnish member 6 so as to be hooked on hooks of the door side. When the screen 2 is drawn out, the drawn-out state of the screen 2 can be maintained by hooking the engagement hole 6a on the hooks.

In addition, a not illustrated pipe member is provided on the garnish member 6, and a lever member 6b, which is supported by the pipe member so that the lever member 6b is rotatable around the pipe member, is provided. A user can easily draw out the screen 2 from the half case 3 by pinching the rotatable lever member 6b. For the lever member 6b, resin molded articles such as injection molded article of thermopolyolefin (TPO) can be used, for example.

The half case 3 is aligned with a recessed portion formed on the door trim side and therefore a housing space of the barrel member 4, the screen 2 and other components is formed. In other words, the half case 3 is a half-split body forming a part of the housing of the shading device 1, and the half case 3 is unitized by being preliminarily assembled with the components such as the screen 2. Thus, only by assembling the half case 3 with the door trim, the shading device 1 is assembled with the door. Of course, the case used for unitizing the shading device can be any cases other than the half case, e.g., a case covering entire the shading device.

The shading device 1 is shipped in a state that the components such as the screen 2 are preliminarily assembled with the half case 3. In an assembling process of the door trim, the half case 3 is fastened to the vehicle body by inserting a conventionally known fastening means such as a screw into a plurality of through holes 3a formed on the half case 3, and the shading device 1 is integrated with the vehicle body.

The shaft members 8, 8' are assembled with both ends of the barrel member 4. The shaft members 8, 8' are supported by the half case 3 so that the shaft members 8, 8' are rotatable around the rotation axis AX1. The elastic force generating portion 5 is attached to the end face 3b of the half case 3.

The elastic force generating portion 5 shown in FIG. 3 includes a spring 11 (biasing mechanism 1b), a clip 9 (locking member 1c) and a housing 1d. The housing 1d includes a cap 10 and a case 12. The spring 11 is housed in a housing space formed by engaging the case 12 and the cap 10. The clip 9 is slid along an external surface of the cap 10. The elastic force generating portion 5 supports the end portion 8f of the shaft member 8 so that the shaft member 8 is rotatable around the rotation axis AX1.

The spring 11 biases the barrel member 4 with which the shaft members 8, 8' are assembled in the winding direction DR1 of the screen 2. The spring 11 shown in FIG. 3 is a spiral spring formed by spirally winding an elastic member such as a stainless material. A folded piece 11a located at an inner terminal is locked to a locking recessed portion 8a of the shaft member 8. A folded piece 11b located at an outer terminal is locked to a locking projection piece 12h of the case 12. Thus, elastic force is given to the shaft member 8 in accordance with a rotation of the shaft member 8.

A size of the spiral spring 11 is not particularly limited. For example, a plate thickness can be approximately 0.1 to 0.3 mm, a width can be approximately 4 to 20 mm, and a length can be approximately 500 to 3000 mm. Since abnormal noise may be generated when the spring 11 is operated, grease is applied as a lubricant according to the need.

Figure 5:
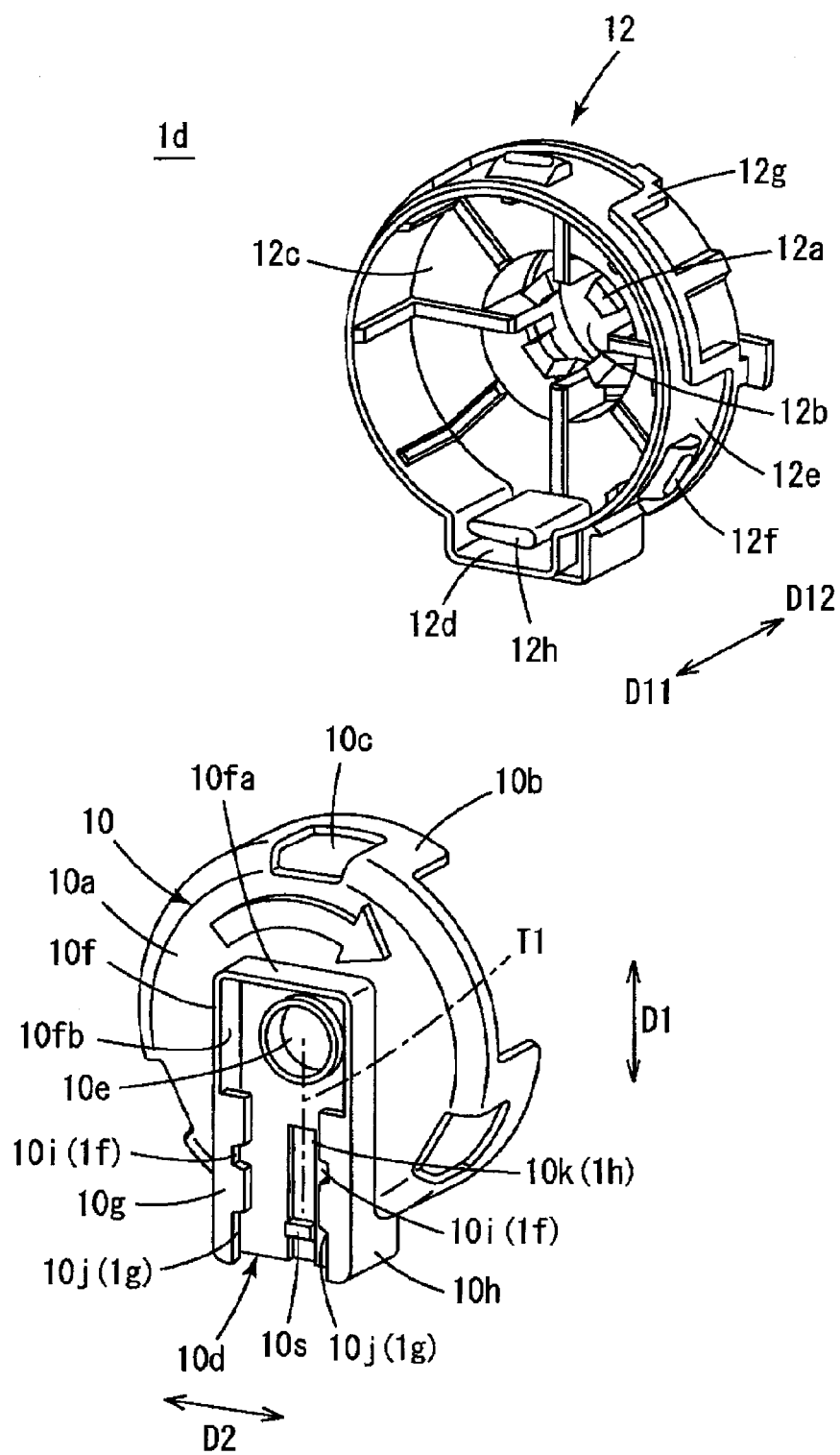
FIG. 5 is an exploded perspective view showing an example of a configuration of a housing 1d.

FIG. 4 shows an outer appearance of the shaft member 8. FIG. 5 shows the housing 1d in an exploded state before engaging the cap 10 and the case 12 with each other. FIGS. 6A to 6D and FIG. 7A to 7D show the clip 9. Note that a background is omitted in the end views of FIG. 6C and FIGS. 7C, 7D.

The lock portion 8e having an approximately rectangular cross section is formed at one end (end portion 80 of the shaft member 8 (rotary shaft member). Between the lock portion 8e and a second flange portion 8d, an outer shape of the shaft member 8 is formed into an approximately cylindrical shape. The inner folded piece 11a of the spring 11 is locked to the locking recessed portion 8a, which is formed at the end portion 8f side than the second flange portion 8d having a larger diameter. A fitting portion 8b having approximately cylindrical outer shape is formed at the other end (end portion 8g) of the shaft member 8. An outer diameter of the fitting portion 8b is designed to be almost same as an inner diameter of the one end 4a of the barrel member 4. The first flange portion 8c having a larger diameter than the fitting portion 8b is formed at a terminal end of the fitting portion 8b of the end portion 8g side than the second flange portion 8d. If the fitting portion 8b is pressed into a hole of the one end 4a of the barrel member 4 and pushed until the barrel member 4 abuts to the first flange portion 8c, the shaft member 8 and the barrel member 4 are fixed with each other so as not to be relatively moved.

In addition, the end portion 8f of the shaft member 8 is inserted toward an outside direction D11 of the rotation axis AX1 into a hole portion 12b of the case 12, and receives elastic force from a plurality of anti-backlash pawls 12a, which have flexibility, of the case 12.

For the shaft members (rotary shaft members) 8, 8', a molded article such as an injection molded article of synthetic resin can be used, for example. For the synthetic resin, thermoplastics resins such as polybutylene terephthalate (PBT) containing a reinforcing fiber can be used, for example. For the reinforcing fiber, a glass fiber can be used, for example. A compounding ratio of the reinforcing fiber can be approximately 5 to 30 wt. %, for example.

The case 12 includes a housing recessed portion 12c having an opening at the cap 10 side to house the spring 11. The hole portion 12b is formed at a bottom portion of the housing recessed portion 12c so that the end portion 8f of the shaft member 8 is inserted into the hole portion 12b. On the periphery of the hole portion 12b, four flexibly deformable anti-backlash pawls 12a are formed integrally with the case at regular intervals. If the end portion 8f of the shaft member is inserted toward the outside direction D11 of the rotation axis AX1 into the hole portion 12b, the shaft member 8 is pressed into the hole portion 12b while flexing the anti-backlash pawls 12a so as to expand the anti-backlash pawls 12a outward, and then the second flange portion 8d is hooked on the anti-backlash pawls 12a. Thus, the shaft member 8 is prevented from moving in the direction of the rotation axis AX1, and a backlash of the shaft portion 1a is suppressed. Therefore, anti-backlash members such as an anti-backlash pin made of metal and a spring clip shown in Japanese Unexamined Patent Application Publication No. 2000-282767 do not have to be prepared for exclusive use. Thus, the number of components and man-hours are reduced.

On an inner surface of the housing recessed portion 12c, a recessed portion 12d, which is recessed outward in a radial direction with the rotation axis AX1 as a center, is formed so that the outer terminal of the spring 11 is arranged on the recessed portion 12d. Near the recessed portion 12d, the locking projection piece 12h is projected from a bottom face of the housing recessed portion 12c toward the outside direction D11 so that the outer folded piece 11b of the spring 11 is locked to the locking projection piece 12h. On an outer surface of a side wall portion 12e of the housing recessed portion 12c, three projections 12f, which have an inclined face inclined downward toward an inner side of the radial direction as going toward the outside direction D11, and a positioning rib 12g for positioning the cap 10 are formed integrally with the case 12.

The cap 10 is engaged with the case 12 and closes an opening of the case 12. A hole portion 10e is formed on a body portion 10a of the cap 10 so that the lock portion 8e is inserted into the hole portion 10e and rotatable around the rotation axis AX1. Three flexible pieces 10b are projected from the body portion 10a toward an inside direction D12 so that the flexible pieces 10b are positioned by the positioning rib 12g. A fitting hole 10c is formed on each of the flexible pieces 10b so that the projection 12f is inserted into the fitting hole 10c. The sliding guide portion 10d is formed on an outer surface (end face of outside direction D11 side) of the body portion 10a so that the clip 9 is slid on the sliding guide portion 10d.

When housing the spring 11 in the housing recessed portion 12c, the inner folded piece 11a is locked to the locking recessed portion 8a of the end portion 8f of the shaft member, which is inserted into the housing recessed portion 12c from the hole portion 12b, and the outer folded piece 11b is locked to the locking projection piece 12h of the case 12. After the spring 11 is housed in the housing recessed portion 12c, the flexible pieces 10b are positioned by the positioning rib 12g and the cap 10 is engaged with the case 12 so that the projections 12f are inserted into the fitting holes 10c. Thus, the housing 1d is formed. Namely, the housing 1d includes the sliding guide portion 10d, the end portion 8f of the shaft portion 1a is inserted into the housing 1d, and the spring 11 is housed in the housing 1d.

The sliding guide portion 10d is formed at a position around the hole portion 10e. The sliding guide portion 10d includes a rising wall portion 10f projected toward the outside direction D11 and a pair of locking flange portions 10g, 10g projected in an inward direction from a tip edge of the rising wall portion 10f toward the track T1 of sliding of the clip 9. On a bottom portion of the sliding guide portion 10d, a guide groove 10k (groove 1h), which is directed in the guide direction D1 of the clip 9, and a locking projection portion 10s, which is projected toward the outside direction D11 at a portion (lower side in FIG. 5) adjacent to the guide groove 10k in the guide direction D1, are formed. The sliding piece 9d of the clip 9 is inserted into the guide groove 10k. The locking projection portion 10s restricts the sliding piece 9d to slide toward the extended portion 10h side in the guide direction D1. Namely, the locking projection portion 10s functions as a stopper of the clip 9.

Note that, as shown in FIGS. 8 and 9, the guide direction D1 is a direction of passing through the lock position P1 where a rotation of the shaft portion 1a is prohibited, and the lock release position P2 where the prohibition of the rotation of the shaft portion 1a is canceled. The sliding guide portion 10d is capable of guiding the clip 9 in the guide direction D1.

The rising wall portion 10f includes a restricting wall 10fa, which is a terminal end (upper side in FIG. 5) of the track T1 of the clip 9, and a pair of guiding walls 10fb, 10fb, which are formed from both ends of the restricting wall 10fa toward a start end (lower side in FIG. 5) in parallel with each other. An extended portion 10h is formed on each of the guiding walls 10fb extending beyond an edge of the body portion 10a. Thus, a stroke required for the sliding of the clip 9 is secured. The extended portion 10h is designed to be engaged with the recessed portion 12d of the case 12 and also functions as a positioning shape of the case 12.

A locking groove 10i (lock position engagement portion 1f) that is used for stopping the slide of the clip 9 at the lock position P1 and a locking groove 10j (release position engagement portion 1g) that is used for stopping the slide of the clip 9 at the lock release position P2 are formed on each of the locking flange portions 10g. The locking groove 10i is a recessed portion to be engaged with locking projection 9g (slide engagement portion 1e) of the clip 9 at the lock position P1. The locking groove 10j is a recessed portion to be engaged with the locking projection 9g of the clip 9 at the lock release position P2. The locking grooves 10i, 10j are recessed outward from inner edges of the locking flange portions 10g, 10g, which are facing each other, with reference to the track T1 of the clip.

Here, the engagement means to be engaged with each other. Therefore, shapes of the lock position engagement portion 1f and the slide engagement portion 1e include various shapes and can be any shape as long as the slide of the locking member 1c is stopped at the lock position P1. Shapes of the release position engagement portion 1g and the slide engagement portion 1e include various shapes and can be any shape as long as the slide of the locking member 1c is stopped at the lock release position P2.

For the above described case 12 and cap 10 and later mentioned clip 9, a molded article such as an injection molded article of synthetic resin can be used, for example. For the synthetic resin, polyacetal (POM), polypropylene (PP), a composite material of the above materials, and a material formed by adding additives to the above materials can be used, for example.

Figure 6A:
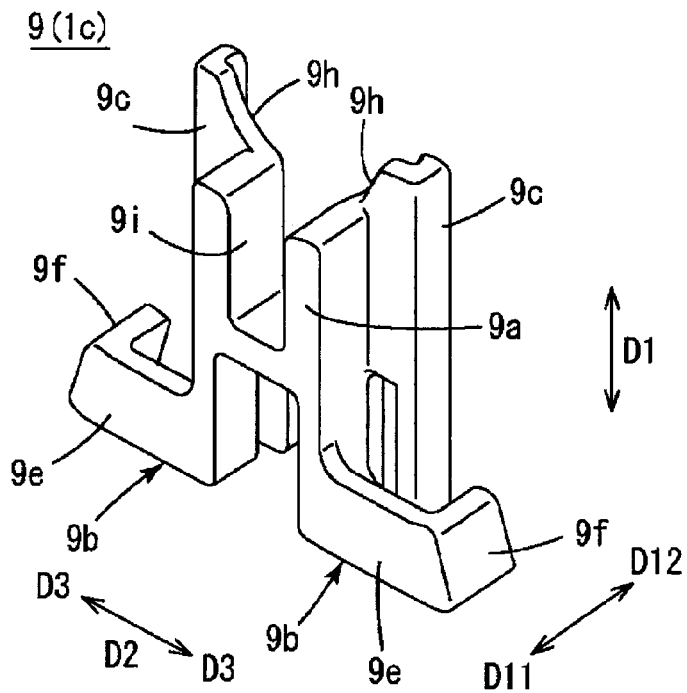
FIG. 6A is a perspective view showing an example of an outer appearance of a clip 9 (locking member 1c).
Figure 6B:
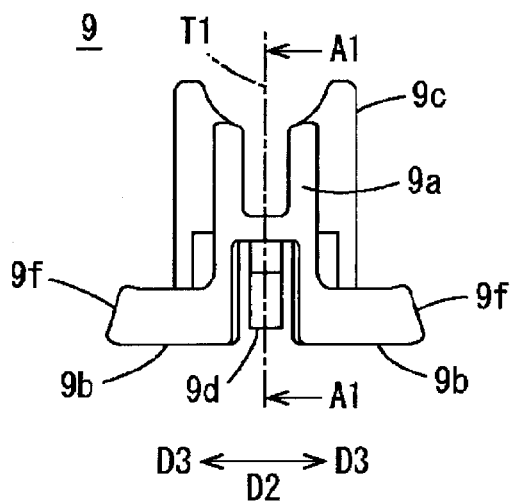
FIG. 6B is a drawing showing an example of a front face of the clip 9.
Figure 6C:
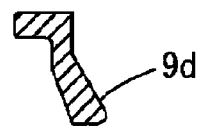
FIG. 6C is an end view obtained when the clip 9 is cut at a position corresponding to the A1-A1 line in FIG. 6B.
Figure 6D:
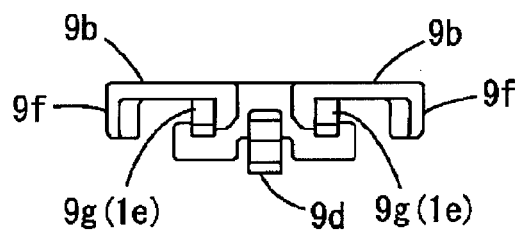
FIG. 6D is a drawing showing an example of a bottom face of the clip 9.
Figure 7A:
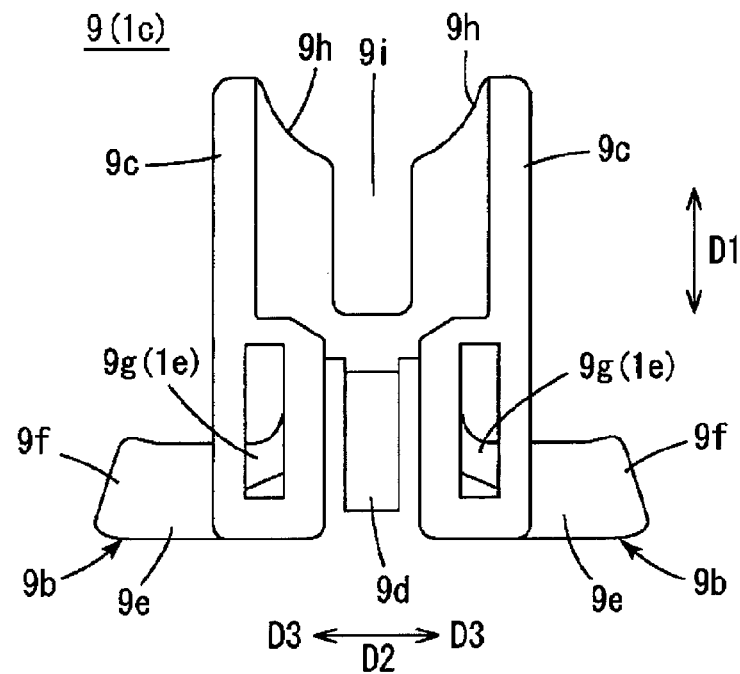
FIG. 7A is a drawing showing an example of a rear face of the clip 9.
Figure 7B:
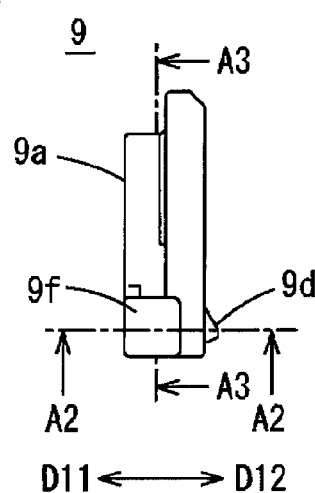
FIG. 7B is a drawing showing an example of a side face of the clip 9.
Figure 7C:
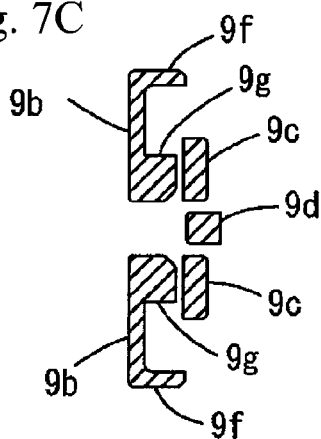
FIG. 7C is an end view obtained when the clip 9 is cut at a position corresponding to the A2-A2 line in FIG. 7B.
Figure 7D:
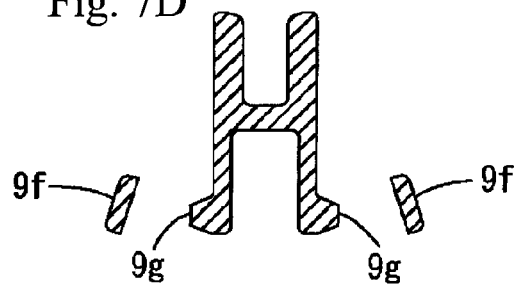
FIG. 7D is an end view obtained when the clip 9 is cut at a position corresponding to the A3-A3 line in FIG. 7B.

FIG. 6A is a perspective view of the clip 9 (locking member 1c). FIG. 6B is a front view of the clip 9. FIG. 6C is an end view obtained when the clip 9 is cut at a position corresponding to the A1-A1 line in FIG. 6B. FIG. 6D is a bottom view of the clip 9. FIG. 7A is a rear view of the clip 9. FIG. 7B is a side view of the clip 9. FIG. 7C is an end view obtained when the clip 9 is cut at a position corresponding to A2-A2 line in FIG. 7B. FIG. 7D is an end view obtained when the clip 9 is cut at a position corresponding to A3-A3 line in FIG. 7B.

The clip 9 is formed of a material having flexibility such as synthetic resin. The clip 9 includes a base body portion 9a having an approximately H-shape, a pair of flexible operating portions 9b, 9b protruded from an end portion (lower side in FIG. 6A) of the sliding piece 9d side in the guide direction D1 of the base body portion 9a toward outward directions D3, D3 of the track T1, a pair of locking projections 9g, 9g integrated with the operating portions 9b, 9b, a pair of sliders 9c, 9c extended from an end portion in the inside direction 12 of the base body portion 9a toward the outward directions D3, D3, and sliding piece 9d arranged between the sliders 9c, 9c. An upper recessed portion 9i of the base body portion 9a has a space corresponding to a width in the short direction of the lock portion 8e having an approximately rectangular cross-section. The lock portion 8e can be entered in the upper recessed portion 9i when the locking recessed portion 8a is directed to one of the guide directions D1. The upper recessed portion 9i has a function of disabling the rotation of the shaft portion 1a including the shaft member 8 by engaging with the lock portion 8e.

Each of the operating portions 9b includes an arm portion 9e, which is apart from the slider 9c toward the outside direction D11 of the rotation axis and is extended in the outward direction D3 from the base body portion 9a, and a knob portion 9f, which is extended in the inside direction D12 from a tip of the arm portion 9e. Each of the arm portions 9e is arranged at the outside direction D11 of the rotation axis from the locking flange portion 10g. Since each of the operating portions 9b is apart from the slider 9c, enough flexibility required for releasing engagement of the locking projection 9g (slide engagement portion 1e) is imparted. The operating portions 9b, 9b can be flexed in the clamping direction D2 with respect to the track T1 of the clip. When the knob portion 9f is pushed toward the track T1, the operating portion 9b is flexed in an inner direction (inside of the clamping direction D2). Therefore, a worker can easily flex the operating portions 9b, 9b so that the operating portions 9b, 9b approach with each other in the clamping direction D2 by pinching the knob portions 9f, 9f between the thumb and forefinger, for example. In addition, when releasing a lock, the clip 9 can be slid to the lock release position P2 only by hooking two fingers on the knob portions 9f, 9f and pulling them, without pinching the knob portions 9f, 9f.

At a surface of the inside direction D12 side of each of the arm portions 9e, the locking projection 9g (slide engagement portion 1e) is formed to be apart from the slider 9c toward the outside direction D11 of the rotation axis. The locking projections 9g, 9g are a projecting portion formed integrally with the arm portions 9e, 9e so that right and left operating portions 9b, 9b are projected in the outward directions D3, D3, which are directions of separating from each other. In other words, the locking projections 9g, 9g are formed facing outward from each other with respect to the track T1 of the clip. Each of the locking projections 9g is engaged with the locking groove 10i of the locking flange portion 10g at the lock position P1 and engaged with the locking groove 10j of the locking flange portion 10g at the lock release position P2.

Since each of the locking projections 9g is integrally formed with the arm portion 9e, the locking projection 9g is moved together with the flexible operating portion 9b. Therefore, if the worker grasps the knob portions 9f, 9f of the operating portions 9b, 9b by hand, the operating portions 9b, 9b are flexed in a direction of approaching each other and the locking projections 9g, 9g are moved in a direction of approaching each other together with the operating portions 9b, 9b. In other words, when the knob portions 9f, 9f are grasped, the locking projections 9g, 9g are moved in an inward direction, which is opposite to the projecting direction, interlocked with the flexure of the operating portions 9b, 9b in the direction of approaching each other. When the clip 9 is located at the lock position P1, the operating portion 9b releases the engagement between the locking groove 10i and the locking projection 9g by being flexed. When the clip 9 is located at the lock release position P2, the operating portion 9b releases the engagement between the locking groove 10j and the locking projection 9g by being flexed.

An outer shape of the sliders 9c, 9c is designed so that the sliders 9c, 9c slide while keeping in contact with the inside of the guiding walls 10fb, 10fb of the sliding guide portion 10d at a position of the inside direction D12 of the rotation axis from the locking flange portion 10g. Curved portions 9h, 9h are formed at an end portion of the upper recessed portion 9i side of the sliders 9c, 9c. Because of this, even when a direction of the lock portion 8e is not aligned with a direction of the upper recessed portion 9i of the clip 9, the lock portion 8e is guided by the curved portions 9h, 9h in accordance with the sliding operation of the clip 9 from the lock release position P2 to the lock position P1. Thus, the lock portion 8e is guided in the upper recessed portion 9i and therefore operability when locking the clip 9 is good.

The sliding piece 9d is slidably inserted into the guide groove 10k of the cap 10. Because of this, the clip 9 to be slid is guided in the guide direction D1 and therefore a backlash of the clip 9 is suppressed.

For the clip 9 having the above described shape, a length of the guide direction D1 can be approximately 10 to 30 mm, a length of the clamping direction D2 can be approximately 10 to 40 mm, and a thickness can be approximately 4 to 15 mm, for example. Although the clip 9 has a relatively small size, operability is excellent. The worker can easily slide the clip 9 without taking off work gloves.

Then, operations, functions and effects of the shading device 1 will be explained.

Figure 8A:
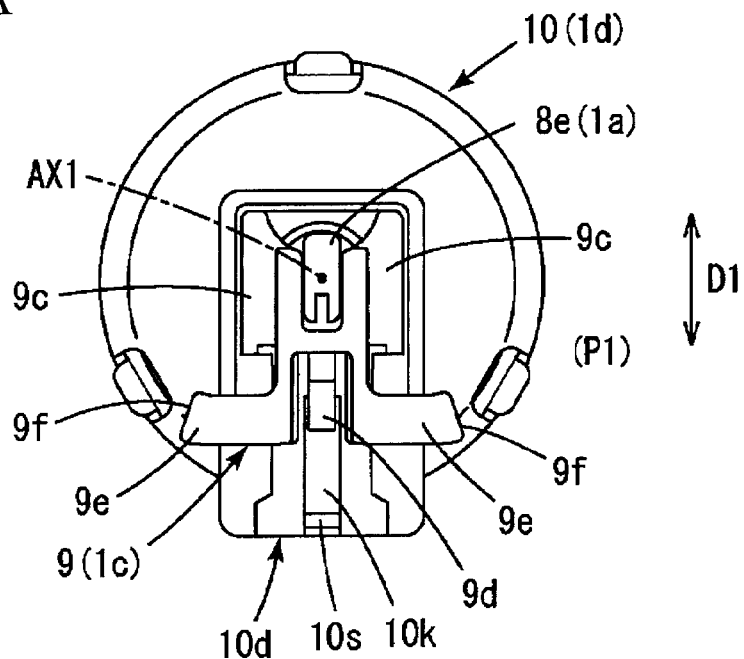
FIG. 8A is a drawing showing an example of a surface of the cap side of the shading device 1 when the clip 9 is located at a lock position P1.
Figure 8B:
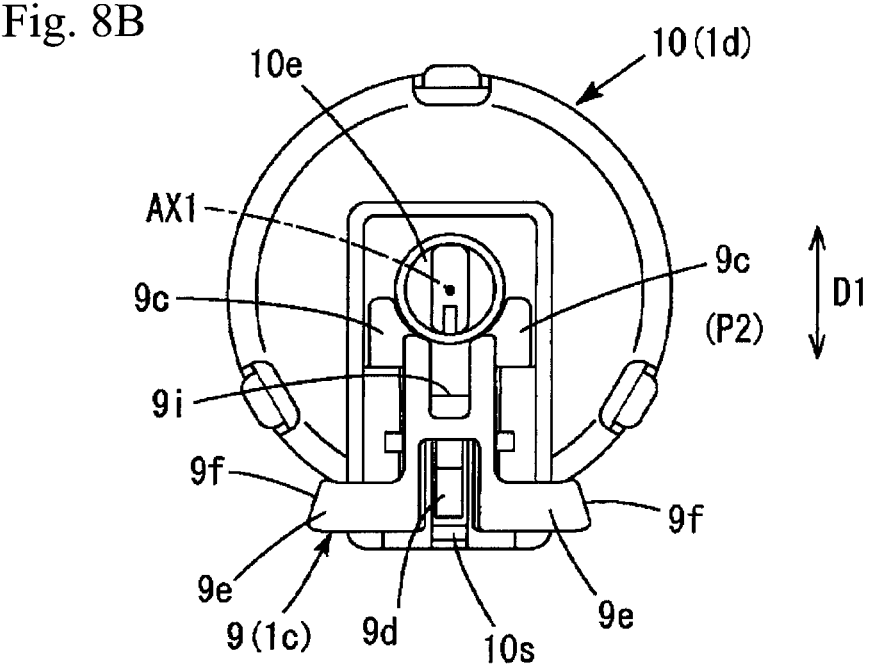
FIG. 8B is a drawing showing an example of the cap side of the shading device 1 when the clip 9 is located at a lock release position P2.
Figure 9A:
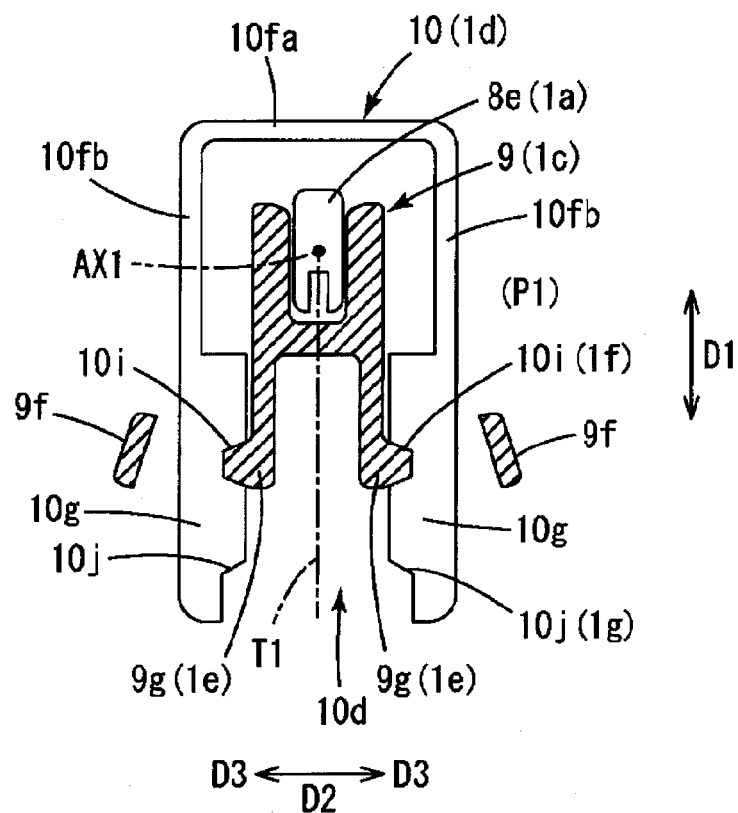
FIG. 9A is an end view showing an example of the shading device 1 in a state that the shaft member 8 is locked and cut by a vertical plane with respect to an axis direction.
Figure 9B:
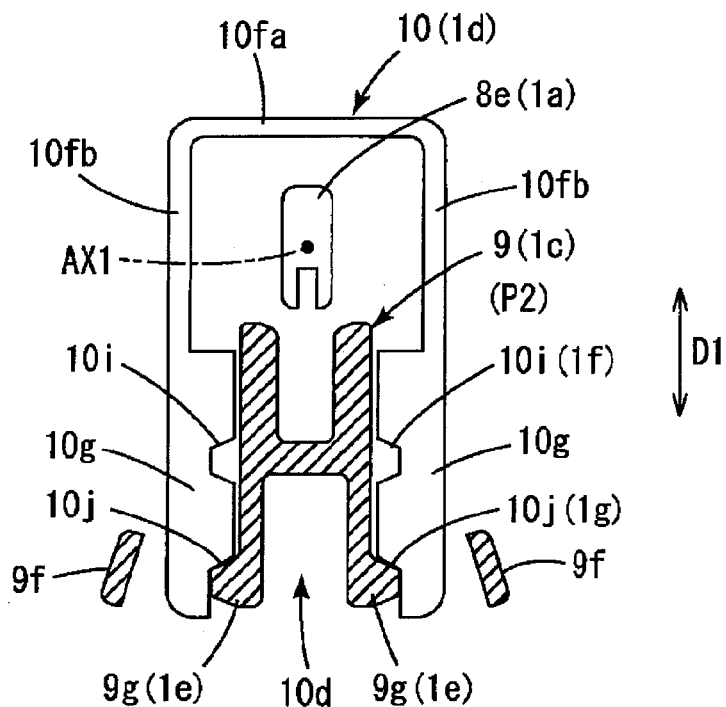
FIG. 9B is an end view showing an example of the shaft member 8 in a state that the shading device 1 is released from locking and cut by a vertical place with respect to the axis direction.

FIGS. 8 A, 8B are drawings viewing the shading device 1 from a side to which the elastic force generating portion 5 is attached in an assembled state of the shading device 1. FIG. 8A shows a surface of the cap side of the shading device 1 when the clip 9 (locking member 1c) is located at the lock position P1. FIG. 8B shows a surface of the cap side of the shading device 1 when the clip 9 is located at the lock release position P2. FIGS. 9A, 9B are end views of the shading device 1 cut by a vertical plane with respect to a direction of the rotation axis AX1 to show the locked state of the locking projection 9g (slide engagement portion 1e) of the clip. A background is omitted. To make the explanation easier, hatching is applied only to the clip 9, and not applied to the other members. FIG. 9A shows the shading device 1 in a state that the shaft member 8 is locked. FIG. 9B shows the shading device 1 in a state that the shaft member 8 is released from locking.

Before the shading device 1 is assembled with the vehicle body such as the door trim 805, firstly, the clip 9 is pulled toward the extended portion 10h side in the guide direction D1 by hooking the fingers on the knob portions 9f, 9f of the operating portions 9b, 9b, and the clip 9 is moved to the lock release position P2 shown in FIG. 8B and FIG. 9B. At that time, the sliding piece 9d is guided by the guide groove 10k (groove 1h) and the clip 9 is slid in the guide direction D1. In addition, since the operating portions 9b, 9b are flexed in the clamping direction D2 (approaching direction), each of the locking projections 9g, 9g of the clip 9 is released from the locking groove 10i (lock position engagement portion 1f) and inserted into the locking groove 10j (release position engagement portion 1g). In this state, the shaft portion 1a, which is made rotatable, is preliminarily wound in the winding direction DR1 by a predetermined number of turns, and then the knob portions 9f, 9f are pinched by fingers and the clip 9 is slid to the lock position P1 shown in FIG. 8A and FIG. 9A. At that time, the sliding piece 9d is guided by the guide groove 10k and the clip 9 is slid in the guide direction D1. In addition, since the operating portions 9b, 9b are flexed in the clamping direction D2, each of the locking projections 9g, 9g of the clip 9 is moved together with the operating portion 9b and released from the locking groove 10j (release position engagement portion 1g). When the worker stops pinching the knob portions 9f, 9f, the locking projection 9g is inserted into the locking groove 10i (lock position engagement portion 1f). In addition, the lock portion 8e is guided by the curved portion 9h and inserted into the upper recessed portion 9i. Thus, the rotation of the shaft portion 1a is prohibited. As a result, the shaft portion 1a can be maintained in a state of being preliminarily wound.

After the shaft portion 1a is unrotatably fixed and the shading device 1 is assembled, if the operating portions 9b, 9b are operated so that the operating portions 9b, 9b are flexed in the clamping direction D2, each of the locking projections 9g is released from the locking groove 10i (lock position engagement portion 10. Therefore, the worker can easily slide the clip 9 to the lock release position P2 to release the locked state of the shaft portion 1a. Furthermore, even after the locked state of the shaft portion 1a is released once, the rotation of the shaft portion 1a can be prohibited again by sliding the clip 9 to the lock position P1. Therefore, if the clip 9 is slid to the lock position P1 in a state that the shaft portion 1a is preliminarily wound in the winding direction DR1 by sliding the clip 9 to the lock release position P2 again, the shaft portion 1a can be maintained in a state of being preliminarily wound. Thus, an operation inspection of the shading device 1 can be performed many times. Therefore, workability of the shading device 1 during the service operation is improved, for example, when a failure occurs.

(3) Second Example

FIGS. 10 to 14 show the second example of the shading device 1.

Figure 10:
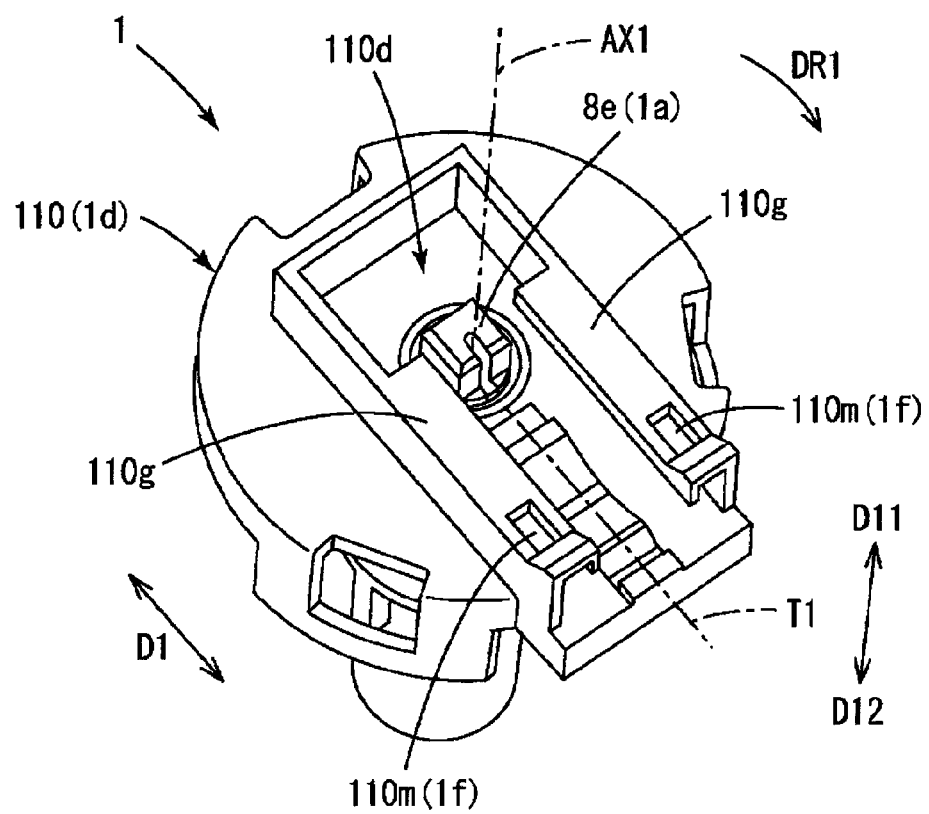
FIG. 10 is an exploded perspective view showing the cap side of the shading device 1 in the second example.
Figure 10:
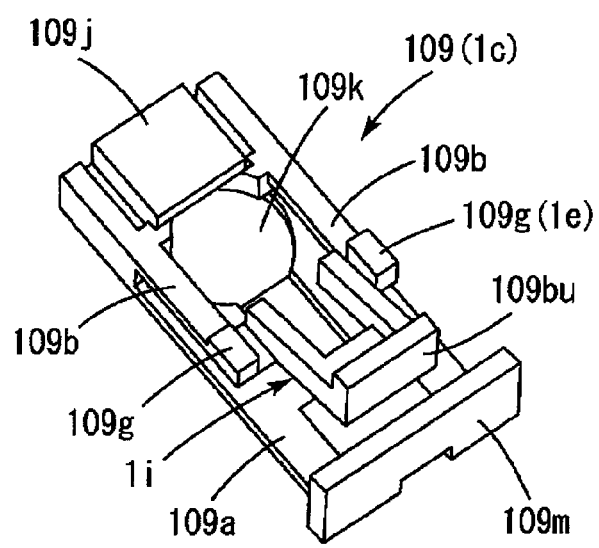

FIG. 10 shows, in an exploded perspective view, the cap side of the shading device 1 in a state of removing the clip 109 (locking member 1c).

Figure 11A:
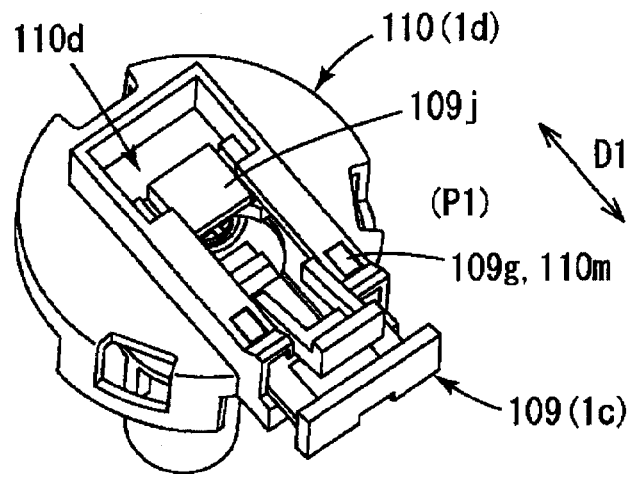
FIG. 11A is a perspective view showing an example of the cap side of the shading device 1 when a clip 109 is located at a lock position P1.
Figure 11B:
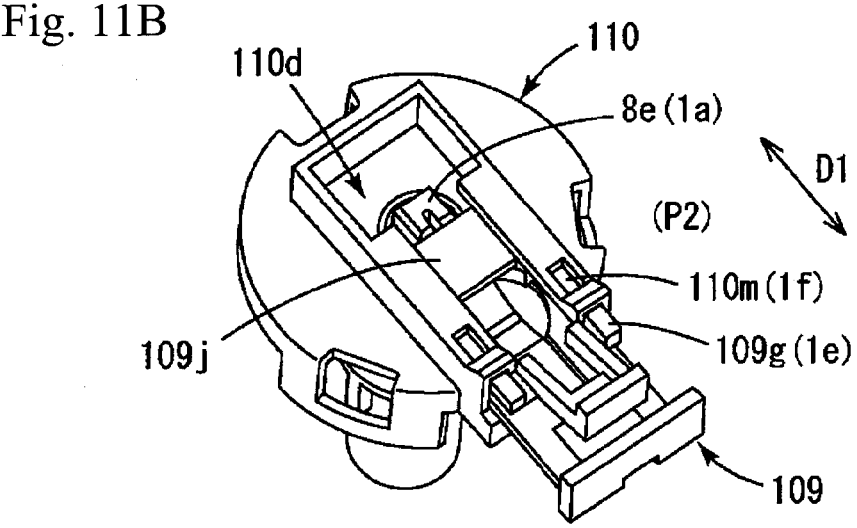
FIG. 11B is a perspective view showing an example of the cap side of the shading device 1 when the clip 109 is located at a first lock release position P2.
Figure 11C:
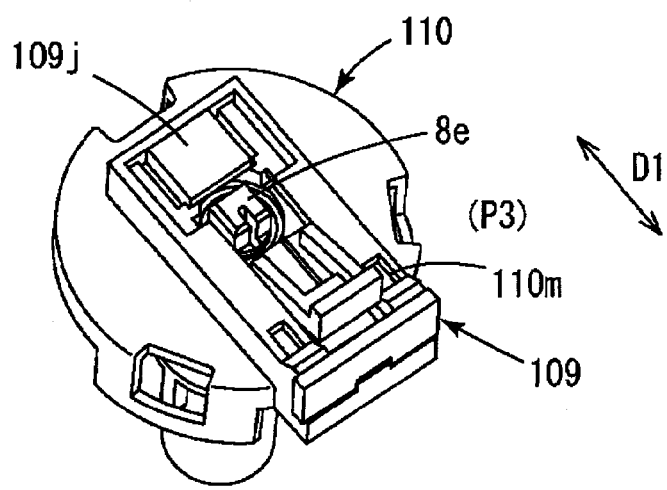
FIG. 11C is a perspective view showing an example of the cap side of the shading device 1 when the clip 109 is located at a second lock release position P3.

FIG. 11A shows the cap side of the shading device 1 when the clip 109 is located at the lock position P1. FIG. 11B shows the cap side of the shading device 1 when the clip 109 is located at the first lock release position P2. FIG. 11C shows the cap side of the shading device 1 when the clip 109 is located at the second lock release position P3.

Figure 12A:
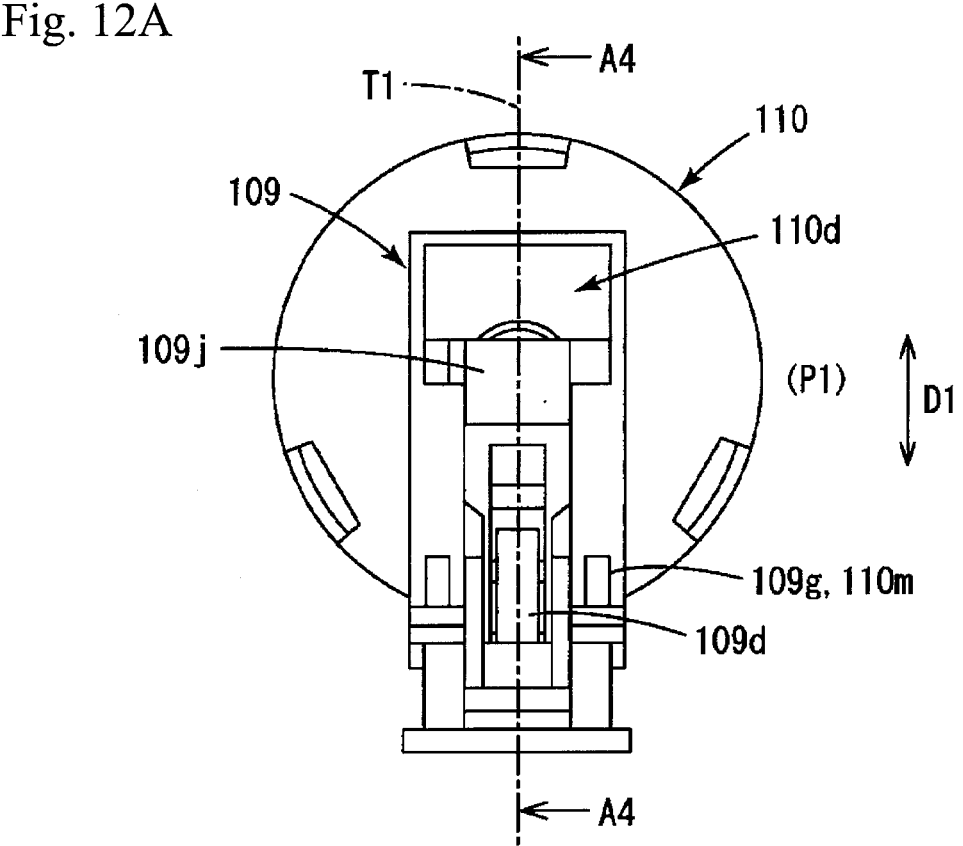
FIG. 12A is a drawing showing an example of a surface of the cap side of the shading device 1 when the shaft member is locked.
Figure 12B:
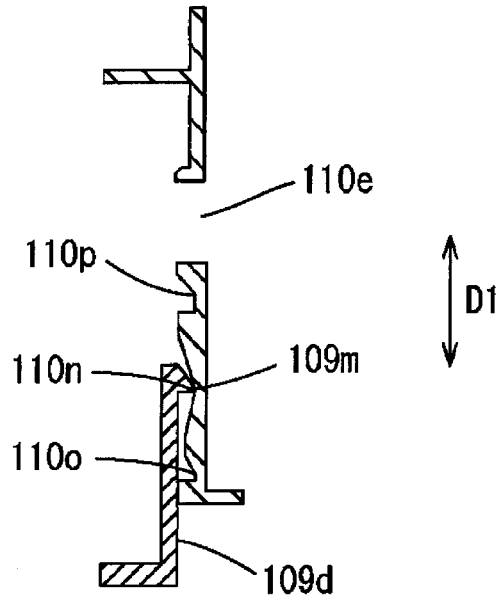
FIG. 12B is an end view obtained when a cap 110 and the clip 109 are cut at a position corresponding to the A4-A4 line in FIG. 12A.

FIG. 12A shows a surface of the cap side of the shading device 1 when the shaft portion 1a is locked. FIG. 12B is an end view obtained when the cap 110 (a part of the housing 1d) and the clip 109 are cut at a position corresponding to A4-A4 line in FIG. 12A.

Figure 13A:
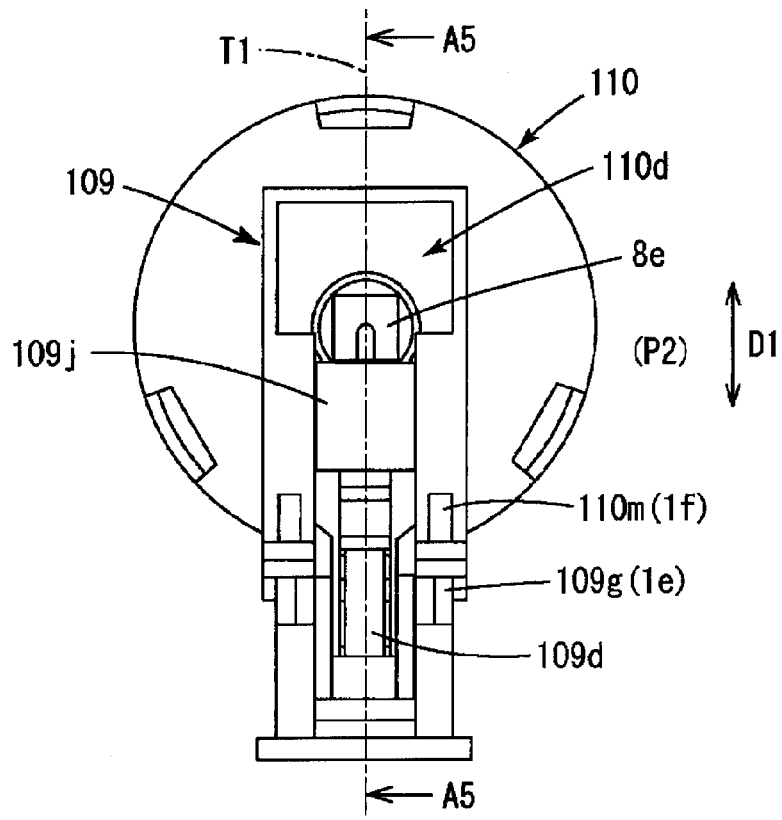
FIG. 13A is a drawing showing an example of a surface of the cap side of the shading device 1 when the clip 109 is located at the first lock release position P2.
Figure 13B:
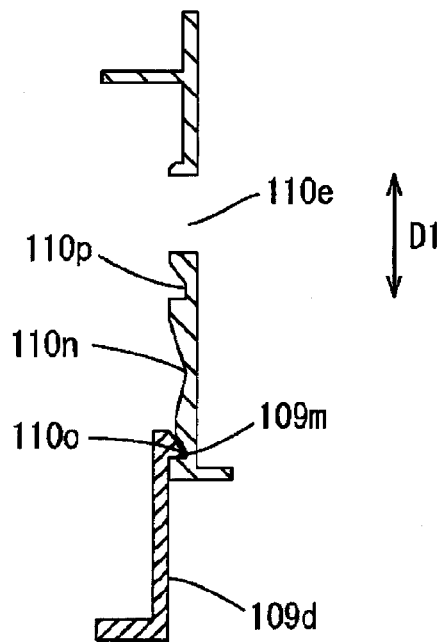
FIG. 13B is an end view obtained when the cap 110 and the clip 109 are cut at a position corresponding to the A5-A5 line in FIG. 13A.

FIG. 13A shows a surface of the cap side of the shading device 1 when the clip 109 is located at the first lock release position P2. FIG. 13B is an end view obtained when the cap 110 and the clip 109 are cut at a position corresponding to A5-A5 line in FIG. 13A.

Figure 14A:
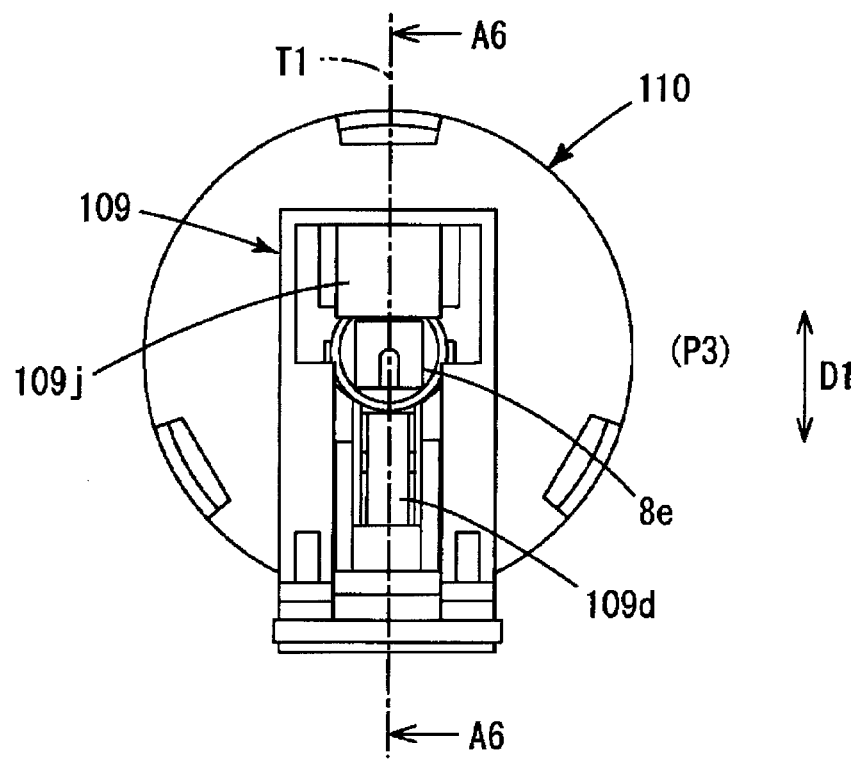
FIG. 14A is a drawing showing an example of a surface of the cap side of the shading device 1 when the clip 109 is located at the second lock release position P3.
Figure 14B:
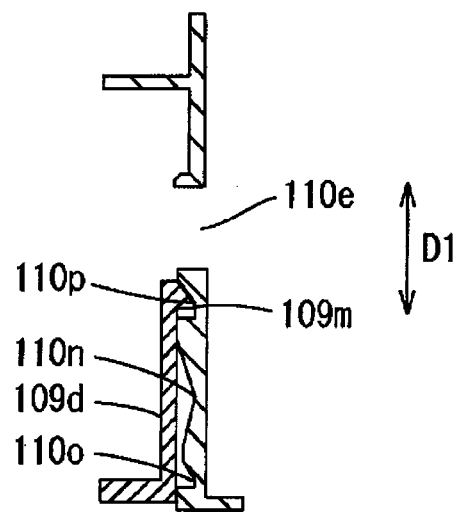
FIG. 14B is an end view obtained when the cap 110 and the clip 109 are cut at a position corresponding to the A6-A6 in FIG. 14A.

FIG. 14A shows a surface of the cap side of the shading device 1 when the clip 109 is located at the second lock release position P3. FIG. 14B is an end view obtained when the cap 110 and the clip 109 are cut at a position corresponding to A6-A6 in FIG. 14A.

Note that only the shaft portion 1a, the cap 110 and the clip 109 are extracted in FIGS. 10, 11 and only the cap 110 and the clip 109 are extracted in FIGS. 12 to 14, omitting other components.

In the second example, a lock portion 8e, a sliding guide portion 110d of the cap 110, and a clip 109 are different from those of the first example. The explanation of other components will be omitted because the other components are same as those of the first example.

In the second example, a second lock release position P3 is provided in the guide direction D1, which passes through the lock position P1 and the lock release position P2. The sliding guide portion 110d prohibits the clip 109 (locking member 1c), which is moved to the second lock release position P3, from sliding to the lock position P1.

Since the lock portion 8e, which passes through a hole portion 110e, has an approximately square cross section, the rotation of the shaft portion 1a can be locked at every quarter turn. Therefore, the number of turns of preliminary winding of the screen 2 can be more freely determined.

A lock portion 109j, a base body portion 109a, a flexible operating portion 1i, locking projections 109g (slide engagement portions 1e), and a rotation allowing hole 109k are formed on the clip 109. The operating portion 1i includes a flexible locking piece 109b, a lock release button 109bu, and a sliding piece 109d.

The lock portion 109j is an alternative of the upper recessed portion 9i of the first example. When the lock portion 8e is inserted into the lock portion 109j, the rotation of the lock portion 8e around the rotation axis AX1 is restricted. The base body portion 109a slides in the sliding guide portion 110d. The locking projections 109g, 109g are formed integrally with the locking pieces 109b, 109b near end portions of locking pieces 109b, 109b. The lock release button 109bu is extended from the end portions of the locking pieces 109b, 109b. The sliding piece 109d is extended from the lock release button 109bu toward the lock portion 109j side of the guide direction D1. A locking pawl 109m, which is projected in the inside direction of the rotation axis AX1, is formed at a tip of the sliding piece 109d. The rotation allowing hole 109k allows a rotation of the shaft portion 1a.

The cap 110 having the sliding guide portion 110d and the hole portion 110e includes locking flange portions 110g, 110g, which are alternatives of the locking flange portions 10g, 10g of the first example, and recessed portions 110n, 110o, 110p. A locking hole 110m (lock position engagement portion 10 is formed on each of the locking flange portions 110g.

After the shaft portion 1a is preliminarily wound in the winding direction DR1 by a predetermined number of turns in a state that the clip 109 is not attached to the sliding guide portion 110d, the clip 109 is inserted into the sliding guide portion 110d and slid in the guide direction D1 to the lock position P1 shown in FIG. 11A and FIGS. 12A, 12B. At that time, each of the locking projections 109g (slide engagement portions 1e) is pushed by a slope portion of the locking flange portion 110g and the locking piece 109b is flexed downward, and then the locking projection 109g is inserted into the locking hole 110m (lock position engagement portion 10. The locking pawl 109m of the sliding piece 109d is locked to a recessed portion 110n of the lock position and the position is restricted. In addition, the lock portion 8e is inserted into the lock portion 109j and the rotation of the shaft portion 1a is prohibited.
As a result, the shaft portion 1a can be maintained in a state of being preliminarily wound.

In order to temporarily release the prohibition of the rotation of the shaft portion 1a for the purpose of the operation inspection of the shading device 1 or the like, the worker should press the lock release button 109bu and slide the clip 109 in the guide direction D1 toward the first lock release position P2 shown in FIG. 11B and FIGS. 13A, 13B. When the lock release button 109bu is pressed, the engagement between the locking projection 109g and the locking hole 110m is released. Then, by pulling the clip 109 toward the first lock release position P2, the clip 109 is slid to the first lock release position P2. In addition, the lock portion 8e is released from the lock portion 109j and the prohibition of the rotation of the shaft portion 1a is canceled. At the first lock release position P2, the locking pawl 109m is locked to a recessed portion 110o of the first lock release position and therefore the clip 109 is prevented from dropping from the cap 110.

The operation inspection of the shading device 1 can be performed many times by switching the position of the clip 109 between the lock position P1 and the first lock release position P2.

In order to allow the rotation of the shaft portion 1a after the shading device 1 is assembled with the vehicle, the worker should press the lock release button 109bu and slide the clip 109 in the guide direction D1 toward the second lock release position P3 shown in FIG. 11C and FIGS. 14A, 14B. When the lock release button 109bu is pressed, the engagement between the locking projection 109g and the locking hole 110m is released. Then, by pushing the clip 109 toward the second lock release position P3, the clip 109 is slid to the second lock release position P3. In addition, the lock portion 8e is released from the lock portion 109j and the prohibition of the rotation of the shaft portion 1a is canceled. At the second lock release position P3, the locking pawl 109m is locked to a rising wall-shaped recessed portion 110p of the second lock release position and therefore the clip 109 is prohibited from sliding from the second lock release position P3 to the lock position P1. At the second lock release position P3, a rising wall portion of the locking pawl 109m and a rising wall portion of the recessed portion 110p of the second lock release position are locked with each other, and therefore the clip 109 is not slid even when the clip 109 is pulled toward the lock position P1. In other words, although the position of the clip 109 can be switched many times between the lock position P1 and the first lock release position P2, if once the position is switched from the lock position P1 to the second lock release position P3, the position cannot be returned to the lock position P1.

From the above, before the shading device 1 is assembled with the vehicle body, the position of the clip 109 can be switched between the lock position P1 and the first lock release position P2 many times. Thus, inspection work of the shading device 1 can be easily performed. After assembled with the vehicle body, if the prohibition of the rotation of the shaft portion 1a is canceled by sliding the clip 109 to the second lock release position P3, the clip 109 is prevented from being mistakenly slid to the lock position P1. Therefore, trouble of being unable to draw out the screen 2 can be prevented. Furthermore, trouble of generating abnormal noise caused by contacting the clip 109 with the shaft portion 1a when using the shading device 1 can be prevented.

Note that, at the second lock release position P3, since the lock release button 109bu is maintained at a position maximally pushed into the sliding guide portion 110d, a housing space of the shading device 1 can be reduced.

(4) Third Example

Figure 15A:
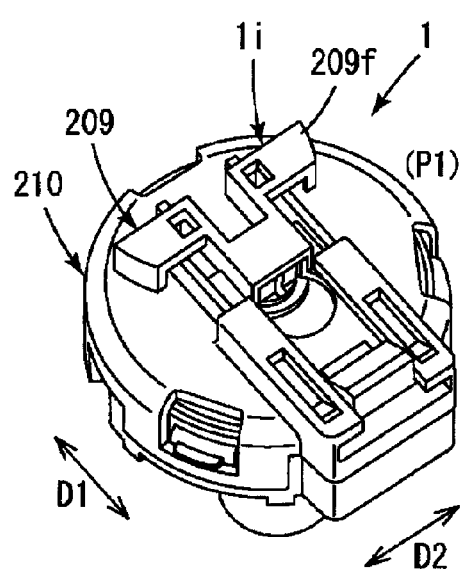
FIG. 15A is a perspective view showing an example of the cap side of the shading device 1 when a clip 209 is located at the lock position P1 in the third example.
Figure 15B:
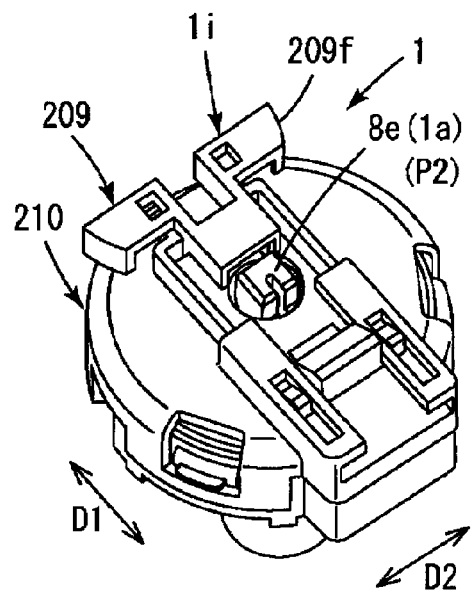
FIG. 15B is a perspective view showing an example of the cap side of the shading device 1 when the clip 209 is located at the lock release position P2.
Figure 15C:
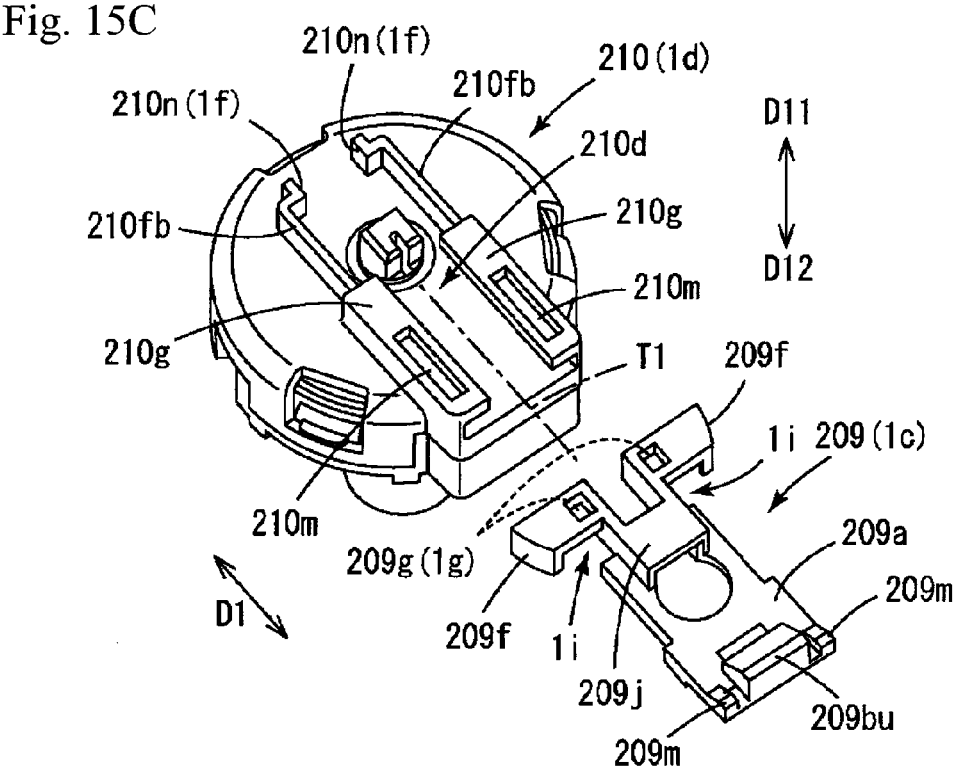
FIG. 15C is a perspective view showing the cap side of the shading device 1 in a state that the clip 209 is removed from the housing 1d.

FIG. 15A shows, in a perspective view, the cap side of the shading device 1 when the clip 209 (locking member 1c) is located at the lock position P1 in the third example. FIG. 15B shows, in a perspective view, the cap side of the shading device 1 when the clip 209 is located at the lock release position P2. FIG. 15C shows, in a perspective view, the cap side of the shading device 1 in a state that the clip 209 is removed from a cap 210 (housing 1d).

The clip 209 (locking member 1c) of the third example is specified to be removed from the housing 1d when the clip 209 is slid from the lock position P1 to an opposite side of the lock release position P2.

Since the lock portion 8e has an approximately square cross section, the rotation of the shaft portion 1a can be locked at every quarter turn.

A lock portion 209j, a base body portion 209a, a flexible operating portion 1i, a locking projection 209g (slide engagement portion 1e), a rotation allowing hole, a second locking projection 209m, and a lock release button 209bu are formed on the clip 209. The operating portion 1i includes a knob portion 209f.

The lock portion 209j is an alternative of the lock portion 109j of the example 2. The base body portion 209a slides in a sliding guide portion 210d. The knob portion 209f is alternative of the knob portion 9f of the first example. The locking projection 209g is formed integrally with the operating portion 1i and moved together with the operating portion 1i, which is flexed. The second locking projections 209m, 209m are formed near the lock release button 209bu. The base body portion 209a is formed to partly have a thinner portion so that a space is formed at a lower side of an end portion on which the lock release button 209bu and the second locking projections 209m, 209m are formed.

The cap 210 having the sliding guide portion 210d includes guiding walls 210fb, 210fb, which are alternatives of the guiding walls 10fb, 10fb of the first example, locking flange portions 210g, 210g, which are alternatives of the locking flange portions 10g, 10g of the first example, and position restricting portions 210n, 210n, which are alternatives of the locking grooves 10i, 10i of the first example. A locking hole 210m is formed on each of the locking flange portions 210g. Each of the position restricting portions 210n (lock position engagement portions 10 is extended from an end portion of the guiding wall 210fb.

After the shaft portion 1a is preliminarily wound in the winding direction DR1 by a predetermined number of turns in a state that the clip 209 is not attached to the sliding guide portion 210d, the clip 209 is inserted into the sliding guide portion 210d and slid in the guide direction D1 to the lock position P1 shown in FIG. 15A. At that time, each of the second locking projections 209m is inserted into the locking hole 210m of the locking flange portion 210g, and each of the locking projections 209g (slide engagement portions 1e) abuts to the position restricting portion 210n (lock position engagement portion 10. In other words, the locking projection 209g and the position restricting portion 210n are engaged with each other and the clip 209 is prevented from being slid to the lock release position P2. In addition, the lock portion 8e is inserted into the lock portion 209j and the rotation of the shaft portion 1a is prohibited. Thus, the shaft portion 1a can be maintained in a state of being preliminarily wound.

In order to temporarily release the rotation lock of the shaft portion 1a for the purpose of the operation inspection of the shading device 1 or the like, the worker should pinch the knob portions 209f, 209f by fingers and slide the clip 209 to the lock release position P2 shown in FIG. 15B. At that time, the operating portions 1i, 1i are flexed in the clamping direction D2 and therefore each of the locking projections 209g of the clip 209 is moved together with the operating portion 1i and each of the locking projections 209g overrides the position restricting portion 210n (lock position engagement portion 10. When the worker stops pinching the knob portions 209f, 209f, each of the locking projections 209g (slide engagement portions 1e) engages with the position restricting portion 210n even if the worker tries to slide the clip 209 toward the lock position P1. In addition, the lock portion 8e is released from the lock portion 209j and the prohibition of the rotation of the shaft portion 1a is canceled. At the lock release position P2, the second locking projection 209m is locked to a locking hole 210m of each of the locking flange portions 210g and therefore the clip 209 is prevented from dropping from the cap 210.

The operation inspection of the shading device 1 can be performed many times by switching the position of the clip 209 between the lock position P1 and the lock release position P2.

In order to allow the rotation of the shaft portion 1a after the shading device 1 is assembled with the vehicle, the worker should press the lock release button 209bu and slide the clip 209 in the guide direction D1 from the lock position P1 to the second lock release position shown in FIG. 15C. Since the above described thinner portion is partly formed on the base body portion 209a, when the lock release button 209bu is pressed, the engagement between the second locking projection 209m and the locking hole 210m is released. Then, by pulling the clip 209 toward an opposite direction of the first lock release position P2, the clip 209 is removed from the sliding guide portion 210d (housing 1d). In addition, the lock portion 8e is released from the lock portion 209j and the prohibition of the rotation of the shaft portion 1a is canceled.

From the above, before the shading device 1 is assembled with the vehicle body, the position of the clip 209 can be switched between the lock position P1 and the lock release position P2 many times. Thus, inspection work of the shading device 1 can be easily performed. After assembled with the vehicle body, if the prohibition of the rotation of the shaft portion 1a is canceled by sliding the clip 209 to the opposite side of the lock release position P2, the clip 209 is prevented from being mistakenly slid to the lock position P1. Therefore, trouble of being unable to draw out the screen 2 can be prevented. Furthermore, trouble of generating abnormal noise caused by contacting the clip 209 with the shaft portion 1a when using the shading device 1 can be prevented. In the maintenance, the rotation of the shaft portion 1a can be locked by inserting the clip 209 into the sliding guide portion 210d again.

Note that, since the clip 209 is unnecessary after assembled with the vehicle body, the clip can be used repeatedly for other shading devices 1. Therefore, the third example makes it possible to reduce the manufacturing cost.

(5) Other Variation Examples

Various variation examples can be considered for the present invention.

The shading device as the sunshade device can be installed on a rear window, a roof window and a front window, for example, without limited to a side window. The shading device can be a tonneau cover device, for example. A direction of drawing the screen can be drawn downward and horizontally, for example, without limited to upward.

The shaft portion can be a single member such as a rod-like member with which the lock portion is integrated, without limited to a combination of the barrel member and the shaft member.

The biasing mechanism can be a helical spring (coil spring) or an elastic member formed of elastomer, for example, without limited to the spiral spring.

The slide engagement portion of the locking member can be a recessed portion or a projecting and recessed portion, for example, without limited to the projecting portion. The lock position engagement portion and the release position engagement portion of the sliding guide portion can be a recessed portion or a projecting and recessed portion, for example, without limited to the projecting portion.

A combination of the slide engagement portion and the operating portion can be one group and two or more groups.

(6) Conclusion

As explained above, according to various embodiments of the present invention, a technology of a shading device and the like on which operation inspection can be performed many times can be provided.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. The present invention includes these features. The present invention includes these features.

What is claimed is:

1. A shading device, comprising:
   a screen;
   a shaft portion to which one end of the screen is fastened, the shaft portion having a lock portion to be locked, the lock portion being formed at an end portion of the shaft portion;
   a biasing mechanism that biases the shaft portion in a winding direction of the screen;
   a locking member that engages with the lock portion at a lock position where the locking member prohibits a rotation of the shaft portion; and
   a housing into which the end portion of the shaft portion is inserted, the housing having a sliding guide portion in which the locking member is slid, wherein
   the sliding guide portion is capable of guiding the locking member in a direction passing through the lock position and a lock release position where the lock portion is released from the locking member, and the sliding guide portion further includes a lock position engagement portion for stopping the locking member from sliding at the lock position, and
   the locking member includes a slide engagement portion that engages with the lock position engagement portion at the lock position and an operating portion that can be flexed to release the slide engagement portion from the lock position engagement portion.

2. The shading device according to claim 1, wherein
   the sliding guide portion includes a release position engagement portion that engages with the slide engagement portion of the locking member at the lock release position, and
   the operating portion can be flexed to release the slide engagement portion from the release position engagement portion.

3. The shading device according to claim 1, wherein
   the locking member includes a pair of the operating portions that can be flexed in a clamping direction with respect to a track of sliding and a pair of the slide engagement portions that are simultaneously moved with each of the operating portions,
   the pair of the slide engagement portions is formed facing outward with respect to the track and opposing to each other, and
   the sliding guide portion includes a pair of the lock position engagement portions that engage with each of the slide engagement portions.

4. The shading device according to claim 1, wherein
   the housing includes a groove that is directed in the direction passing through the lock position and the lock release position, and
   the locking member includes a sliding piece that is slidably inserted into the groove.

5. The shading device according to claim 1, wherein
   a second lock release position is provided in the direction passing through the lock position and the lock release position, and
   the sliding guide portion prohibits the locking member from sliding to the lock position when the locking member is slid to the second lock release position.

6. The shading device according to claim 1, wherein
   the locking member is removed from the housing when the locking member is slid from the lock position to an opposite side of the lock release position.

* * * * *